(12) United States Patent
Gopalan et al.

(10) Patent No.: US 11,354,173 B2
(45) Date of Patent: *Jun. 7, 2022

(54) ARTIFICIAL INTELLIGENCE-POWERED CLOUD FOR THE FINANCIAL SERVICES INDUSTRY

(71) Applicant: FLAIST, Inc., Dublin, CA (US)

(72) Inventors: Krishnan Gopalan, Dublin, CA (US); Vikram Ramesh, Austin, TX (US); Poomalai Udaiyar Ganesan, Irving, TX (US)

(73) Assignee: FLAIST, INC., Dublin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/173,733

(22) Filed: Feb. 11, 2021

(65) Prior Publication Data

US 2021/0165697 A1 Jun. 3, 2021

Related U.S. Application Data

(63) Continuation of application No. 16/824,873, filed on Mar. 20, 2020, now Pat. No. 10,963,316.

(60) Provisional application No. 62/823,118, filed on Mar. 25, 2019.

(51) Int. Cl.
*G06F 9/54* (2006.01)
*G06F 8/34* (2018.01)
*G06F 21/31* (2013.01)

(52) U.S. Cl.
CPC .............. *G06F 9/54* (2013.01); *G06F 8/34* (2013.01); *G06F 21/31* (2013.01)

(58) Field of Classification Search
CPC ........................................................ G06F 9/541
USPC ........................................................ 719/328
See application file for complete search history.

(56) References Cited

U.S. PATENT DOCUMENTS

| 9,887,876 | B2 | 2/2018 | Kumar |
| 10,715,564 | B2 | 7/2020 | Mohamad Abdul |
| 2005/0159945 | A1 | 7/2005 | Otsuka et al. |
| 2006/0136203 | A1 | 6/2006 | Ichikawa |
| 2016/0124742 | A1 | 5/2016 | Rangasamy et al. |
| 2018/0189857 | A1 | 7/2018 | Wu |
| 2019/0042988 | A1 | 2/2019 | Brown |
| 2020/0251111 | A1 | 8/2020 | Temkin |

OTHER PUBLICATIONS

International Search Report and Written Opinion, International Application No. PCT/US2020/023780, dated Jun. 25, 2020, 10 pages.

*Primary Examiner* — Andy Ho
(74) *Attorney, Agent, or Firm* — Dilworth IP, LLC

(57) ABSTRACT

A cloud system for an application to be built and executed is provided, the cloud system including a microservice platform including one or more application programing interfaces (APIs) and one or more service modules, wherein each API is configured for the application to access services of one or more services modules of the cloud system and wherein the one or more service modules are in communication with the microservice platform and the application using the APIs, each of the service modules being configured to provide at least one service to the application, when being called using at least one API pertaining to each of the service modules, and the microservice platform being configured to allow an app control access to each of the service modules using a user account of the user.

18 Claims, 41 Drawing Sheets

| Intents | | Language English ▼ | Type Retail Banking ▼ | | |
|---|---|---|---|---|---|
| | | | Q | + Prebuilt Intent | + Add Intent |
| Name ↑ | Description | Keywords | | Date Check | Amount Check |
| account balance | Intent to get the account balance | what's my accounts balance\|the balance in my account | | ✓ | ✓ |
| future_financial_status | Intent to get future financial savings taking into consideration the current income and a 20% savings | what will be my future financial position\|future financial position\|how will my finances look in the next 15 years\|how will my finances look in the next 15 years\|show my finances\|how will my finance look\|how old my finances\|show will my money look like in future\|how will my money look like in the future\|how old my money look like in future\|how old my money look like in the future | | ✓ | ✓ |
| get_next_payment_due | intention to get the next payment due date | next payment due\|credit card payment due\|when should I pay next | | ✗ | ✗ |

FIG. 3A

Word listing:*  available\|bandwidth\|left\|availability\|balance\|spend\|spending\|available\|remaining\|cash\|card

FIG. 3B

```
{
  "header ": {
    "query_id": "2393202",
    "query_type": "simulation",
    "language": "english",
    "user_query_text": "how much have I spent on travel last month",
    "display_screen_name":
    "spend_results",
    "display_type":
    "message_transaction",
    "intent_name": "spend_check",
    "domain": "retail_banking",
    "matching_phrase": "how much have I spent",
    "category": "travel",
    "confidence_score": "83.34"
}
```

FIG. 5B

```
{
  "header":{
  "query_id":"",
  "user_query_text":"show me my spending by category for last month",
  "display_type":"spend_by_category_pie_chart",
  "display_message":"Here is your spend by category information for last month",
  "voice_message":"Here is your spend by category information for last month",
  "intent_name":"spend_by_category",
  "ml_model_name":"ml_spend_analysis",
  "ml_model_type":"dynamic_ml_query",
  "baseline_ml_sql":"select round(sum(t.amount)) as "value", plc.category_level0 as "category" from account a , item item, institutionmaster i , transaction t , categorymaster plc ",
  "ml_sql_where_condition":" where t.account_id = a.account_id and a. item_id = item.id and item.institute_id = i.id and a.deleted_at is null and t.category_id = plc.category_id and t.name not like "* %" and and t.category_id is not null and t.category_id <>0 and plc.category_level0 not in ('Service', 'Transfer', 'Payment') and t.amount > 0",
  "ml_sql_group_by":" category",
  "ml_sql_order_by":" category",
```

FIG. 8

| 372 | | 374 | 373 |
|---|---|---|---|
| | DIALECT CODE | DESCRIPTION | + Add dialect |
| ☐ | ar-egypt | Dialect for Arabic in Egypt | |
| ☐ | ar-uae | Dialect for Arabic in UAE | |
| ☐ | ar-bh | Dialect for Arabic in Bahrain | |
| ☐ | hi-mumbai | Dialect for Hindi in Mumbai | |
| ☐ | ar-jeddah | Dialect for Arabic in Jeddah | |
| ☐ | ar-riyadh | Dialect for Arabic in Riyadh | |
| > GO | | | 6 dialects |

FIG. 13C

| 376 | 377 | 378 | 379 |
|---|---|---|---|
| | INTENT | DIALECT | KEYWORD UTTERANCES | WORD LISTING |
| ☐ | available_balance | ar-bh | ما هو رصيدي المتوفر، ما هو رصيدي المتوفر | المتوفر الرصيد، كم هو رصيدي |
| ☐ | available_balance | ar-jeddah | الرصيد المتوفر كم، أش رصيدي | المتوفر الرصيد كم |
| ☐ | available_balance | ar-riyadh | الرصيد المتوفر كم، كم المتبقي بالرصيد، كم المتبقي في الرصيد | رصيدي المتوفر، المتبقي بالرصيد |
| ☐ | monthly_average_spending | ar-riyadh | | المصروف الشهري |

FIG. 13D

| Intentions | Entities | Contexts |
|---|---|---|
| Int1 | Ent1, Ent2 and Ent3 | Ct1 and Ct2 |
| Int2 | Ent1, Ent4 and Ent5 | Ct2 and Ct3 |
| Int3 | Ent1, Ent3 and Ent4 | Ct1 |
| Int4 | Ent2, Ent3 and Ent4 | Ct4 |
| Int5 | Ent1 and Ent2 | Ct5 |
| Int6 | Ent1 and Ent4 | Ct6 |
| ... | ... | ... |

FIG. 14B

| Cards  | Reward Categories | Reward |
|--------|-------------------|--------|
| Card 1 | Gas               | 5%     |
|        | Grocery           | 2%     |
|        | ...               | ...    |
| Card 2 | Gas               | 2%     |
|        | Grocery           | 2%     |
|        | ...               | ...    |
| ...    |                   | ...    |

FIG. 17A

1810
```
{
  "header": {
    "query_id": "",
    "user_query_text": "what is a good card to use at restaurants",
    "display_screen_name": "default",
    "display_type": "card_recommendation",
    "display_message": "Here are your card recommendations",
    "voice_message": "Here are your card recommendations",
    "display_value": "",
    "display_notes": ""
  },
```

1820
"card_reco_data": [

1821 Output Parameter (Card 1)

1822 Output Parameter (Card 2)

```
{
    "rank": 1,
    "total_thumbs_up": 5,
    "thumbs_up_display_text": "Recommended",
    "institution_id": "ins_10",
    "institution_name": "American Express",
    "name": "Blue Cash Everyday",
    "ending_number": "1006",
    "subtype": "Credit Card",
    "account_id": "mBJ34L0eY8FvvPeRqZ07SqmJJgR71nIM60w5Z",
    "notes": ":point_right: Your current credit usage on this card is Excellent (0.7%)! Your available balance on this card is $19,868.00",
    "query_id": 8277,
    "user_id": 3,
    "card_id": 23,
    "card_name": "Blue Cash Everyday",
    "card_type": "Credit",
    "card_issuer": null,
    "card_small_image_file_name": null,
    "card_large_image_file_name": null,
    "reward_type": null,
    "amount": 100,
    "estimated_reward_value": 5,
    "weighted_average_value_for_account": 1.6
}
```

```
{
    "rank": 2,
    "total_thumbs_up": 4,
    "thumbs_up_display_text": "Recommended",
    "institution_id": "ins_5",
    "institution_name": "Citibank",
    "name": "CitiAAdvantage Gold World EliteTM Mastercard: 6311",
    "ending_number": "6311",
    "subtype": "Credit Card",
    "account_id": "w4PbogkPR3CL3b64p4Q4sDDRDb6Bx6fLmLX3R",
    "notes": ":point_right: Your current credit usage on this card is Excellent (0.8%)! Your available balance on this card is $11,252.88",
    "query_id": 8277,
    "user_id": 3,
    "card_id": 21,
    "card_name": "CitiAAdvantage Gold World EliteTM",
    "card_type": "Credit",
    "card_issuer": null,
    "card_small_image_file_name": null,
    "card_large_image_file_name": null,
    "reward_type": null,
    "amount": 100,
    "estimated_reward_value": 2,
    "weighted_average_value_for_account": 1.5
}
```

FIG. 18C

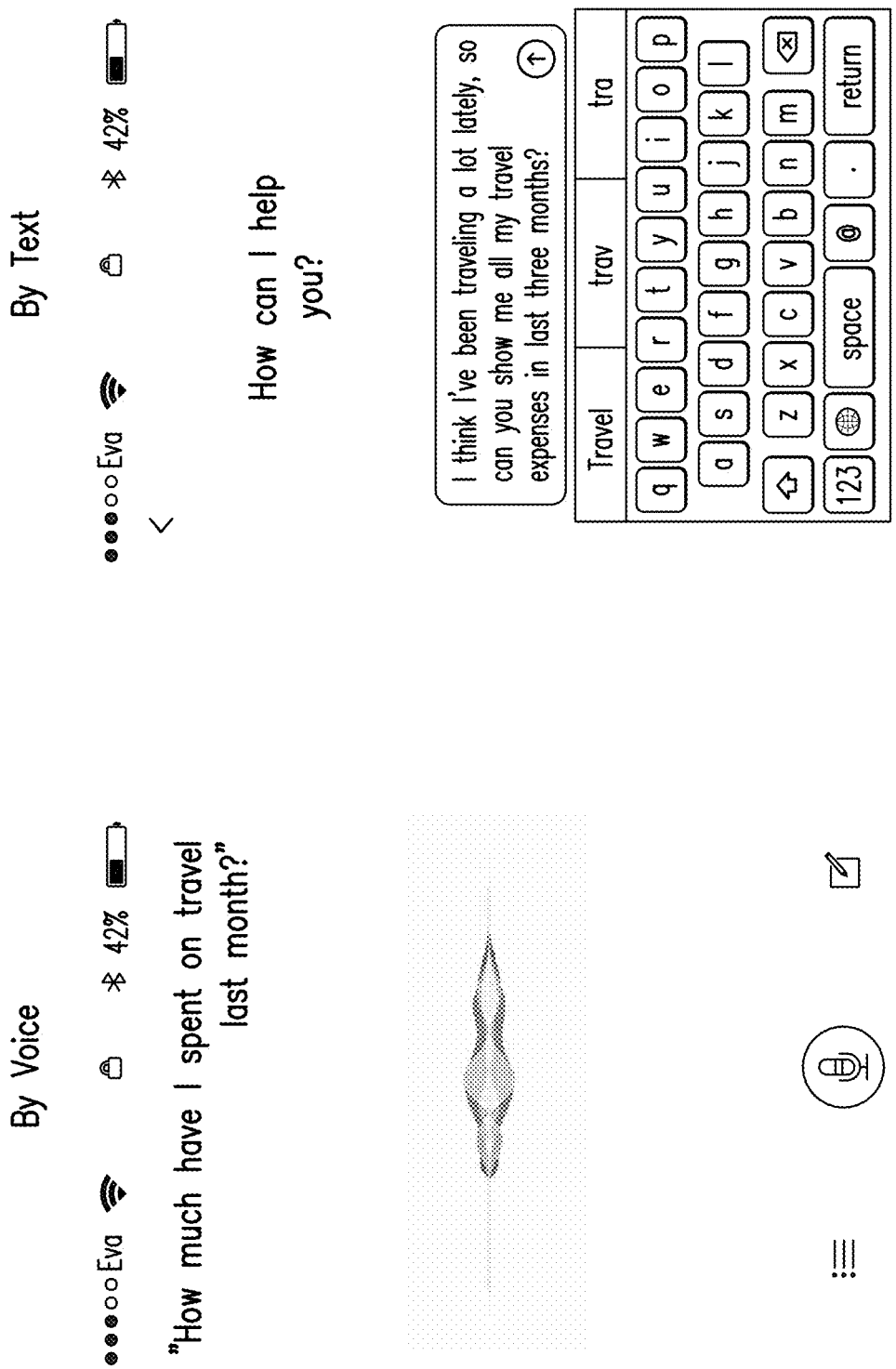

```
{
"simulation_results":{
"query_id": "2393203",
"query_type": "production",
"language": "english",
"user_query_text": "how much have I spent on travel last month",
"display_screen_name": "spend_results",
"display_type": "message_transaction",
"intent_name": "spend_check",
"domain": "retail_banking",
"matching_phrase": "how much have I spent",
"confidence_score": "89.24"
}
}
```

FIG. 24A

```
{
"simulation_results":{
"query_id": "2393203",
"query_type": "production",
"language": "english",
"user_query_text": "how much have I spent on travel last month",
"sentiment_name": "concerned",
"confidence_score": "92.12"
}
}
```

FIG. 24B

```
{
  "header": {
    "query_id": "",
    "user_query_text": "how much have I spent on travel last month",
    "display_type": "spend_by_category_pie_chart",
    "display_message": "Here is your spend by category information for last month",
    "voice_message": "Here is your spend by category information for last month",
    "intent_name": "spend_by_category",
    "ml_model_name": "ml_spend_analysis",
    "ml_model_type": "dynamic_ml_query",
    "baseline_ml_sql": " select round(sum(t.amount)), t.transaction_name, t.transaction_date, t.transaction_amount, plc.category_level0 as "category" from account a , item item, institutionmaster i , transaction t , categorymaster plc ",
    "ml_sql_where_condition": " where t.account_id = a.account_id and a. item_id = item.id and item.institute_id = i.id and a.deleted_at is null and t.category_id = plc.category_id and t.name not like '* %' and and t.category_id is not null and t.category_id <>0 and plc.category_level0 not in ('Travel'",
    "ml_sql_group_by": " category ",
    "ml_sql_order_by": " category ",

"How much did I spend on travel last month?"

Tap to Edit

You have spent $3,353.31 during last month. Here are the associated transactions.

---

Mon, Dec 31, 2018

Laz Pkg Oakland      $3.00
Credit Card

---

Sun, Dec 30, 2018

Shell      $60.48
Credit Card

---

Sun, Dec 30, 2018

Laz Parking 680141      $30.00
Credit Card

---

Hold to speak

| #Snapshot Show Less | | #InterestPaid |
|---|---|---|
| Total Cash $5,669.04 | | You have paid $580.00 as interest and late payment fees in the past 30 days |
| Available Credit $66,224.63 | Total Debt $33,404.60 | |

✈ – Travel           $11649.00
🏢 – Service          $4474.00
🍴 – Food and Drink   $587.00
🎁 – Shops            $539.00

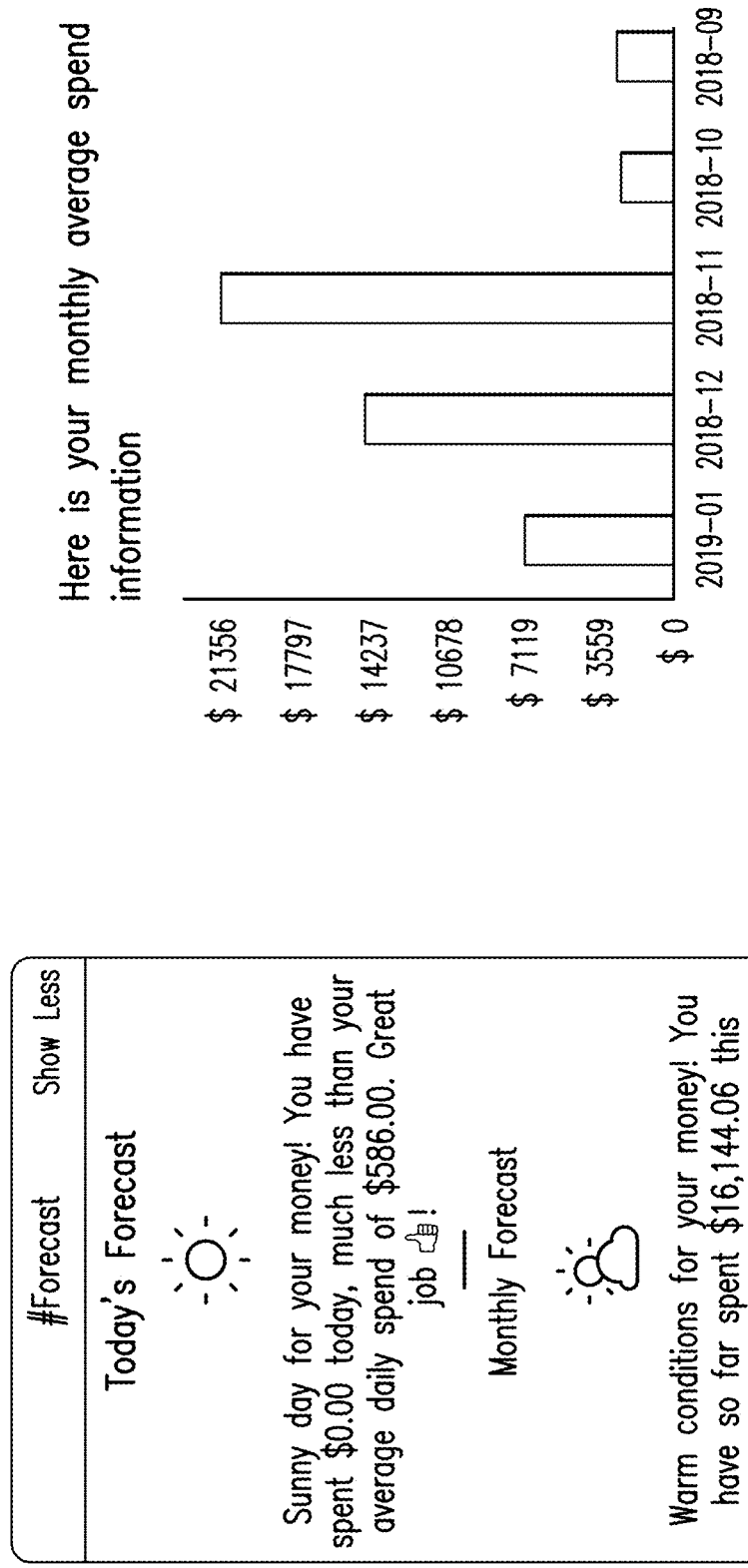

… # ARTIFICIAL INTELLIGENCE-POWERED CLOUD FOR THE FINANCIAL SERVICES INDUSTRY

REFERENCE TO RELATED APPLICATION

The present application is a continuation of U.S. application Ser. No. 16/824,873, filed Mar. 20, 2020, which is based on and claims benefit of U.S. Provisional Application Ser. No. 62/823,118, filed Mar. 25, 2019, the entire contents of each of which are herein incorporated by reference.

BACKGROUND OF THE DISCLOSURE

Technical Field

The present disclosure relates to artificial intelligence and in particular, to artificial intelligence-powered cloud for the financial services industry.

Description of the Background Art

Various artificial intelligence (AI)-based client applications (e.g., virtual assistants) in financial industry have been developed to build solutions enabling financial institutions (or banks) to anticipate and meet client's needs and empower client service teams to deliver relevant solution. For successful development and operations of the client applications, securing AI-powered platforms supporting AI functions is needed.

If each financial institution establishes its own AI-powered platforms for this, it may practically take much cost and time to secure the AI-powered platforms with satisfiable performance and accuracy.

To address these issues in the related art, there is a need for cloud-based platform that allows financial institutions to build their customized AI-powered solutions without having to learn and build AI, machine learning, and other services to be required and use the services as plug-n-play components.

SUMMARY

The present disclosure describes (in the form of methodologies, apparatuses and systems) for artificial intelligence-powered cloud for the financial services industry.

Disclosed is a cloud system for an application to be built and executed, comprising: a microservice platform including one or more application programing interfaces (APIs) configured for the application to access services of one or more services modules of the cloud system; and the one or more service modules in communication with the microservice platform and the application using the APIs, each of the service modules is configured to provide at least one service to the application, when being called using at least one API pertaining to each of the service modules, wherein the microservice platform is configured to allow an app control access to each of the service modules using a user account of the user.

Further disclosed is a machine learning module, comprising: at least one processor; memory coupled to the at least one processor, the memory storing processor readable program instructions including at least one machine learning model that, when executed by the at least one processor, cause the at least one processor to: associate the at least one machine learning model with an intention defined in an intention analysis module, wherein the intention analysis module in communication with a microservice platform and the machine learning module using at least one application programming interface (API), is configured to receive a call from the microservice platform along with a user query provided from an application and determine another intention matched to the user query; receive a call from the microservice platform through the at least one API; invoke the at least one machine learning model in response to determining that the another intention matched to the user query is the intention associated with the at least one machine learning model; and generate, using the invoked at least one machine learning model, an output response based on one or more input parameters provided using the at least one API.

Still further is disclosed a method for driving a machine learning module, comprising: associating the at least one machine learning model with an intention defined in an intention analysis module, wherein the intention analysis module in communication with a microservice platform and the machine learning module using at least one application programming interface (API), is configured to receive a call from the microservice platform along with a user query provided from an application and determine another intention matched to the user query; receiving a call from the microservice platform through the at least one API; invoking the at least one machine learning model in response to determining that the another intention matched to the user query is the intention associated with the at least one machine learning model; and generating, using the invoked at least one machine learning model, an output response based on one or more input parameters provided using the at least one API.

Still yet further is disclosed a sentiment analysis service module for determining a sentiment based on a user query, comprising: at least one processor; memory coupled to the at least one processor, the memory storing processor readable program instructions that, when executed by the at least one processor, cause the at least one processor to: receive a call from a microservice platform through an application programing interface (API) along with the user query; split one or more keywords of the user query and store the split keywords into the memory; determine one or more candidate sentiments based on the stored split keywords; determine respective confidence scores of the candidate sentiments; and determine at least one of the candidate sentiments as a matching sentiment of the user query, based on the determined confidence scores.

Still yet further is disclosed an intention analysis service module for determining an intention based on a user query, comprising: at least one processor; memory coupled to the at least one processor, the memory storing processor readable program instructions that, when executed by the at least one processor, cause the at least one processor to: receive a call from a microservice platform through an application programing interface (API) along with the user query; split one or more keywords of the user query and store the split keywords into the memory; determine one or more candidate intentions based on the stored split keywords; determine respective confidence scores of the candidate intentions; and determine at least one of the candidate intentions as a matching intention of the user query, based on the determined confidence scores.

Still yet further is disclosed a card recommendation service module, comprising: at least one processor; memory coupled to the at least one processor, the memory storing processor readable program instructions that, when executed by the at least one processor, cause the at least one processor to: receive a call from a microservice platform through one or more application programing interfaces (APIs) along with a query of a user; update one or more user preference flags according to a user preference input by the user, the user preference flags indicating a goal that the user wants to achieve from using cards. determine a scenario of a plurality of scenarios stored in the memory, based on the user preference flags; read corresponding reward information for each of a plurality of candidate cards from the memory; calculate, for each of the plurality of candidate cards, a card recommendation score at least using the reward information, according to the determined scenario; determine a card among the plurality candidate cards as the best card for recommendation based on the at least one of the weighted average value and the reward value; and provide information of the recommended best card to a user interface device using the one or more APIs.

Still yet further is disclosed a conversational intelligence service module, comprising: at least one processor; memory coupled to the at least one processor, the memory storing processor readable program instructions that, when executed by the at least one processor, cause the at least one processor to: receive a call from a microservice platform through one or more application programing interfaces (APIs) along with a query of a user; send the user query to an intention analysis service module, wherein the intention analysis module is in communication with the microservice platform and the conversational intelligence service module using the APIs and is configured to determine an intention based on the user query and one or more entities associated with the determined intention; gather one or more output parameters including at least one of the determined intention of the user and the one or more entities; send the gathered output parameters to one or more machine learning models of a machine learning module associated with the output parameters, the one or more machine learning models being configured to perform analytics based on the sent output parameters and generate an output response; and send the generated output response to a user interface device for being displayed.

Still yet further is disclosed an on-demand analytics service module for providing an analytic result on user data stored in database to a user device, comprising: at least one processor; memory coupled to the at least one processor, the memory storing processor readable program instructions including at least one analytical model that, when executed by the at least one processor, cause the at least one processor to: define one or more machine learning (ML) models of an ML service module for the at least one analytical model; call the ML module to execute the one or more ML models in response to determining that the at least one analytical model runs in an application, a portion of which is installed in the user interface device, wherein the on-demand analytics service module and the ML service module are in communication with a microservice platform via one or more application programing interfaces (API); generate a dynamic query by executing the one or more ML models; generate an output response of the on-demand service module by applying the generated dynamic query on the user data; and display the output response on a user interface of the user device.

BRIEF DESCRIPTION OF THE DRAWINGS

A more particular description will be rendered by reference to specific embodiments thereof that are illustrated in the appended drawings. Understanding that these drawings depict only typical embodiments thereof and are not therefore to be considered to be limiting of its scope, illustrative embodiments will be described and explained with additional specificity and detail through the use of the accompanying drawings in which:

FIG. 3A is an example visual representation of a microservice platform dashboard showing prebuilt intentions of an intention analysis module according to an embodiment of the present disclosure and FIG. 3B depicts an individual word listing that can be updated as a corpus for the intention;

FIG. 5B is a diagram of an example JSON output of the intention analysis module according to an embodiment of the present disclosure;

FIG. 8 is a diagram of an example JSON output of the ML module according to an embodiment of the present disclosure;

FIGS. 13A and 13B depict a flow chart of a method of how the intention service module works in communication with the client support application to determine a user's intention and next actions to be conducted for the determined user's intention according to an embodiment of the present disclosure and FIG. 13C depicts a dialect definition list and FIG. 13D depicts a training model that can be created according to illustrative embodiments of the present disclosure;

FIG. 14B depicts example respective confidence scores determined for the candidate intentions according to an embodiment of the present disclosure;

FIG. 17A depicts examples of the array of connected cards including information on the reward values for various categories according to an embodiment of the present disclosure;

FIGS. 18A to 18C depict diagrams of example JSON output formats of the card recommendation module according to an embodiment of the present disclosure;

FIGS. 23A and 23B depict diagrams for explaining as to how a user query is input by voice or text according to an embodiment of the present disclosure;

FIGS. 24A and 24B depict examples JSON output responses of the intention analysis module and the sentiment analysis module, respectively according to an embodiment of the present disclosure;

FIG. 25 depicts an example JSON output response of the ML model according to an embodiment of the present disclosure;

FIGS. 27A to 27E depict examples of the display types according to an embodiment of the present disclosure.

Figure 1:
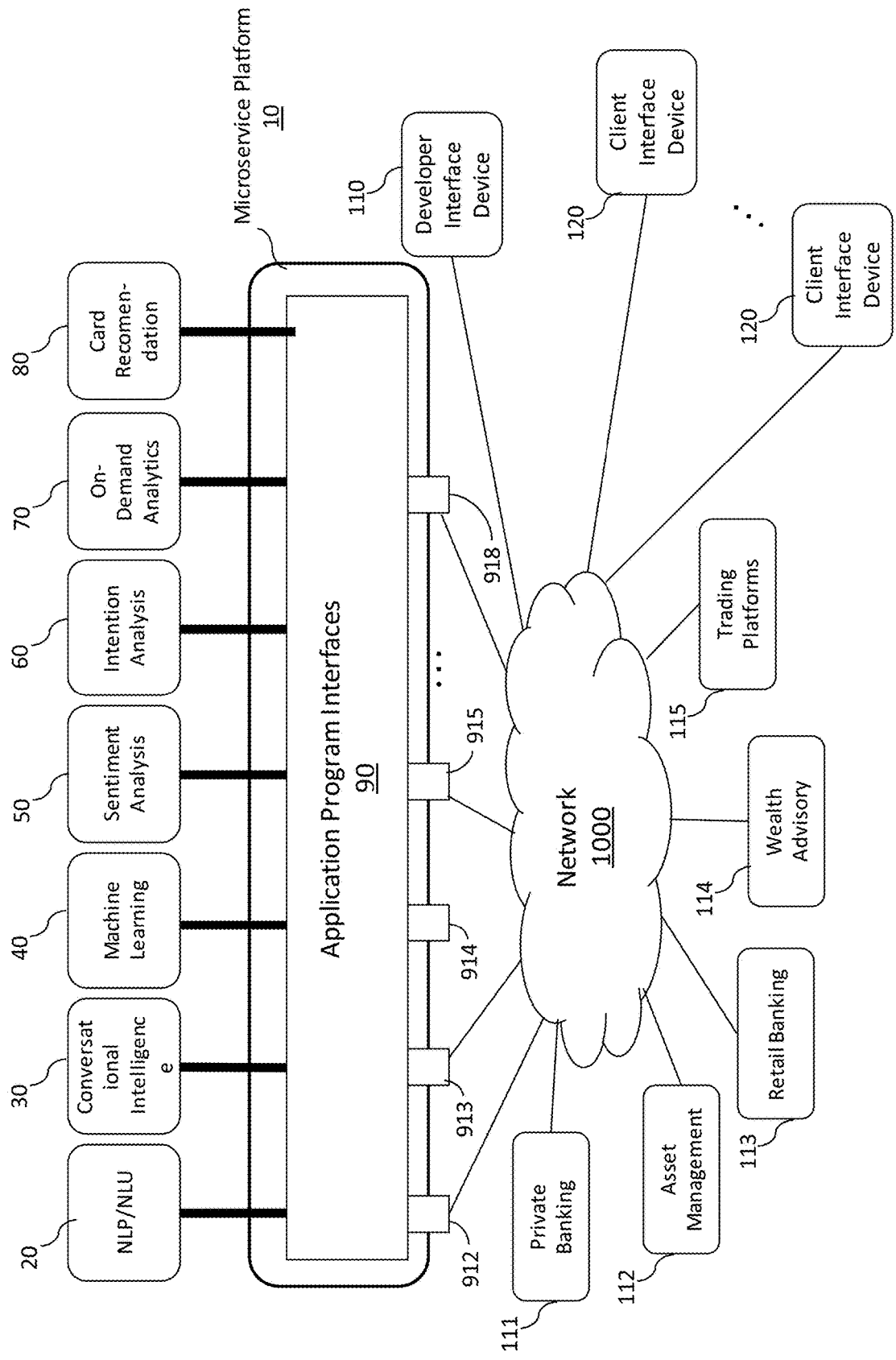
FIG. 1 is a diagram of an example AI-powered cloud system according to an embodiment of the present disclosure.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

DETAILED DESCRIPTION OF THE ILLUSTRATIVE EMBODIMENTS

Embodiments of the present disclosure provide a more efficient solution or method for allowing financial institutions to develop AI-powered solutions (e.g., client applications) which can be used for fulfilling their business needs such as anticipating client needs, delivering personalized products and solutions, analyzing massive amounts of data to identify unique characteristics of clients, empowering client service teams to deliver relevant solutions.

For purposes of illustrating features of the embodiments, embodiments of the disclosure will now be introduced in reference to the figures. Those skilled in the art will recognize that the described embodiments are illustrative and not limiting and are provided purely for explanatory purposes.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

By way of example, the financial institutions include, but are not limited to: commercial banks, investment companies, etc. that process monetary transactions including business and private loans, client deposits, investments or the like.

For the sake of description, the present disclosure will be described with reference to a case where financial institutions build a client support application as only an example to show how the AI-powered cloud system is configured and operated for the client support application to be developed and executed thereon. However, embodiments of the present disclosure are not limited thereto. The client support application is understood as any of application programs (e.g., AI-based virtual assistants) that run on the cloud microservice platform and various microservice modules provided as plug-and-play components. The user interface of the client support application may be installed on various form factors at client ends. The form factors may be client interface devices such as smartphones, connected cars, home assistants, smart TVs, etc.

According to an illustrative embodiment, the AI-powered cloud system is based on a microservice platform in communication with a plurality of microservice modules via one or more application programing interfaces (APIs). The microservice platform allows financial institutions to build client support applications for the financial institutions by providing them microservice modules as plug-and-play components via corresponding APIs.

As used herein, the term "developer(s)" is used to indicate an individual or an interface device belonging to a financial institution who works for building client support application(s) by accessing various resources and data of the AI-powered cloud system. Thus, the developer(s) can be interchanged with cloud user(s) or financial institution(s) for the sake of the description. In addition, unless not clearly indicated in the specification and the claims, the term "user(s)" is understood to mean client(s) to financial institutions that use(s) the client support application. For example, the term "user query" is a query generated by a user.

The term "entity" simply determines converting a noun, place, a product, or a service to a parametrized value that can be used for further analytical processing. Thus, as used in the description with regard to the intention analysis module 60, the term "entity" is understood to signify references in the user's question related to timeline, banking account type, shopping categories, merchant business name, amounts, banking institution name, location, account sub type, etc. These are named/predefined entities as part of the intention analysis module 60.

The term "context" determines the background or any other setting in which the user is requesting for additional information. Contextual analysis is simply an analysis of the user's query to assess if there is a context or an economic setting associated to the user's query to better understand the customers background. For example, the user question could be "I am planning to buy a new car and would like to get some tips to improve my credit score", so the context in the query is that the user is planning to buy a new car which determines a context of lifestyle change.

The terms "call" and "invoke" can be used interchangeably.

Referring now to FIG. 1, illustrated is an AI-powered cloud system in communication with a developer interface device 110, one or more client interface devices 120, multiple domains including private banking 111, asset management 112, retail banking 113, wealth advisory 114, trading platform 115, etc. via a communication network 1000. The cloud system may be implemented with a microservice platform 10 and various microservice modules including, but are not limited to: a natural language processing/natural language understanding (NLP/NLU) module 20, a conversational intelligence module 30, a machine learning (ML) module 40, a sentiment analysis module 50, an intention analysis module 60, an on-demand analytics module 70, a card recommendation module 80, etc. in communication with the microservice platform 10 when the microservice modules 20 to 9 are called using APIs 90 pertaining thereto.

The APIs 90 can be implemented within the microservice platform 10. The APIs 90 include endpoints 912 to 918 (collectively, "endpoints"), each of which represent a portion of the corresponding API and is exposed to a developer, so that the exposed API endpoints will be called by the client support application or the developer to access appropriate microservice modules pertaining to the API endpoints. For example, after being built, client applications may also access services of the microservice modules by calling the API endpoints.

For example, the developer uses a developer interface device 110 to access the resources of the microservice platform 10 and the microservice modules 20 to 80 via the communication network 1000 to build the client support application.

In case the developer (or the built client support application) needs to call any of the microservice modules 20 to 80, it may send a service request to an API endpoint pertaining to the microservice module being called, and the API endpoint may send the request along with relevant parameters (to be described later in detail) to the microservice module(s) via the corresponding API and may respond back to the developer (or the built client support application) with corresponding output responses provided by the microservice module(s).

As such, the microservice platform 10 can serve as an interfacing mean interface owing to the APIs 90 in communication therewith and their corresponding endpoints 912 to 918 exposed to the developer (or built client support application), so that the developer (or built client support application) will be able to call the microservice modules 20 to 80 and obtain corresponding output responses via the APIs and endpoints. These features of the present cloud system allow each service module to exist and work independently of each other, thereby enabling the developer (or financial institutions) to plug and play the APIs 90 in order to build the client support application pertaining to e.g., the financial services industry.

The APIs 90 can be leveraged to build solutions for multiple use cases ranging from private banking, retail banking, asset management to robo-advisory tools, wealth advisory, trading platform. etc. This can be accomplished by leveraging the cloud microservice platform 10 that uses REST (Representational State Transfer)ful APIs and endpoints. In some embodiments, the cloud system may be hosted on a larger commercialized cloud network (e.g., Amazon web services (AWS)) available over the Internet. According to other embodiments the cloud system can be deployed as a container on a local area corporate network or on their secure private cloud as needed by financial institutions.

In the present illustrative embodiments, one or more of the microservice platform 10 and the above-noted microservice modules 20 to 80 may be implemented using a hardware processor and/or may be based on a field-programmable gate array (FPGA) design (not shown), but in other embodiments, they may be implemented based on program codes which are stored in memory or in the hardware processor, and executed by the hardware processor.

Figure 2A:
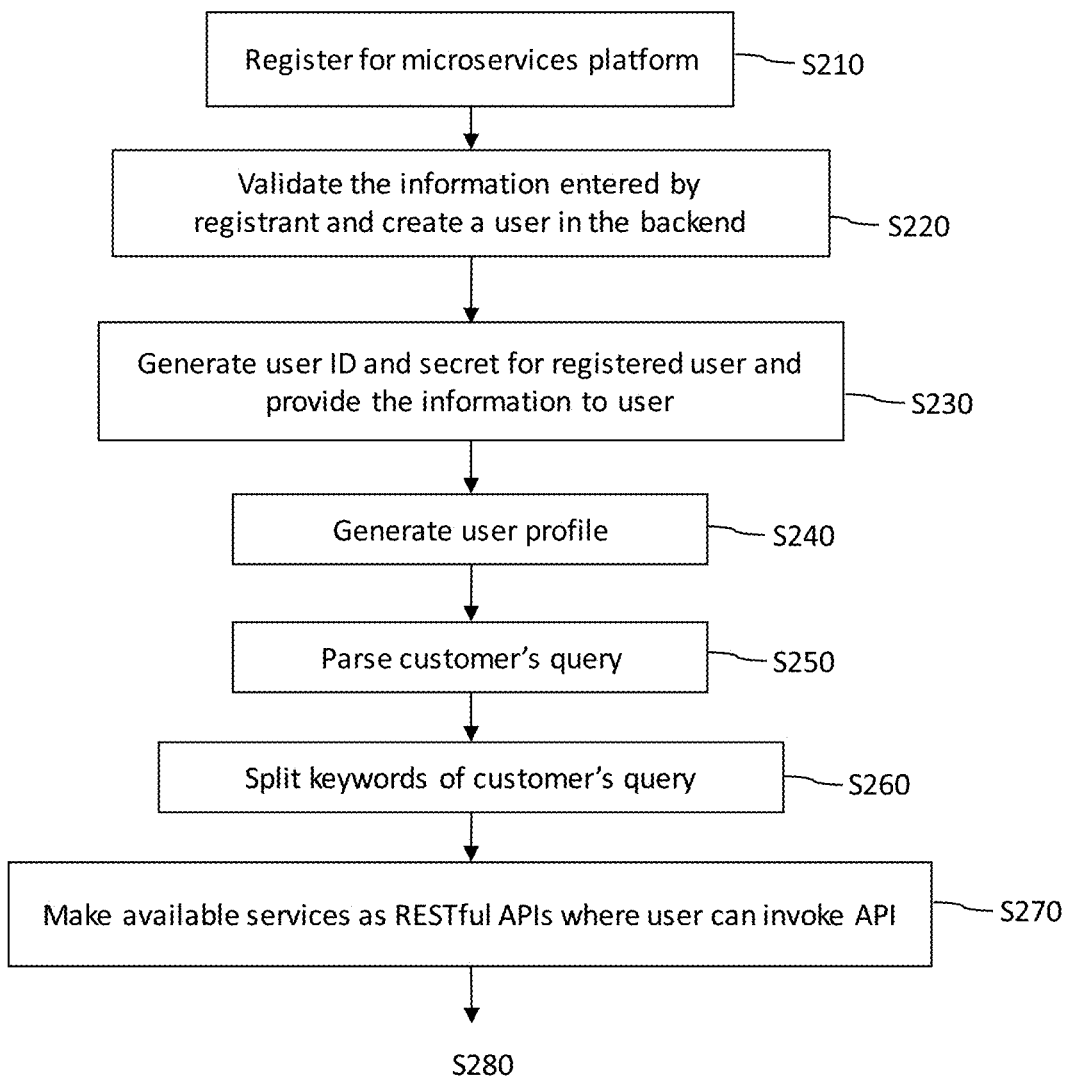
FIGS. 2A and 2B depict a flow chart of a method as to how a microservice platform works to interact with a developer or a built client support application according to an embodiment of the present disclosure.
Figure 2B:
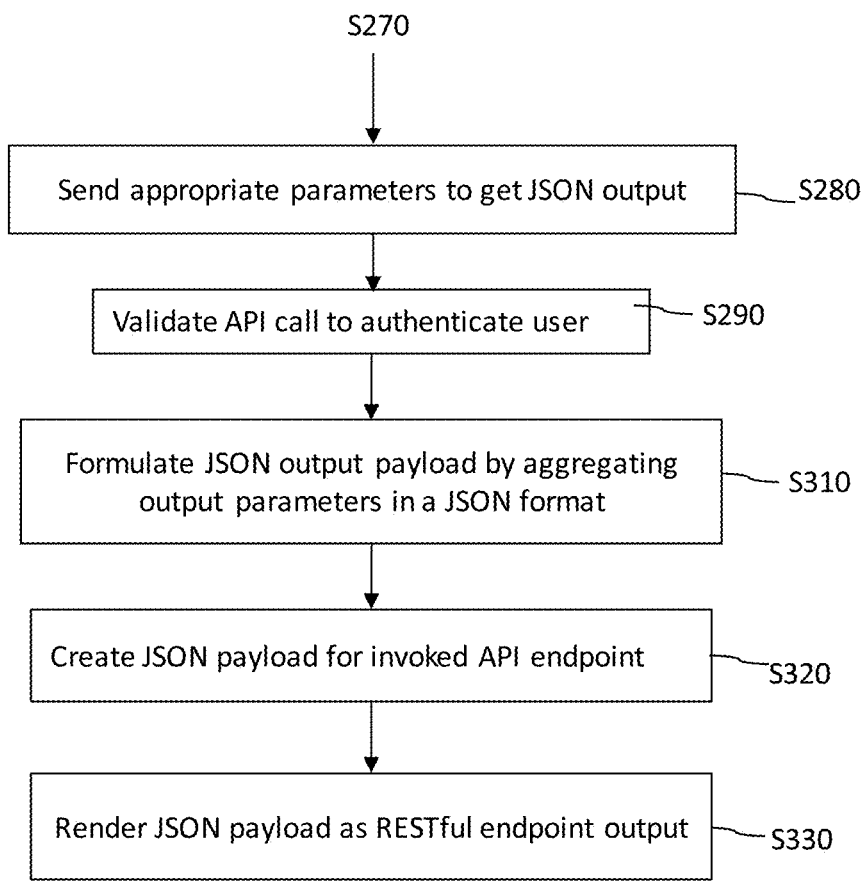

FIGS. 2A and 2B depict a flow chart of a method as to how the microservice platform 10 works to interact with the developer or the built client support application according to an embodiment of the present disclosure.

In order to let the developer build the client support application based on the present cloud system, the microservice platform 10 is configured to allow the developer to register thereto as a new cloud platform user as a step S210.

The following outlines the steps for new users to register for the microservice platform 10:

(a) Create a mechanism for the developer/financial institution to register for the platform (S210);

(b) Validate the information entered by the registrant (e.g., email, phone number, password and/or name) and create a cloud platform user in the backend (S220);

(c) Validate the registrant by sending a one-time passcode (to the email or to the phone number as chosen by the registrant) (not shown);

(d) Perform post verification of the registrant, generate a "client ID" and "secret" for the registered user and provide the information to the user (S230); and (e) Generate a user profile (e.g., user name and password) for the user for future authentication (S240).

The secret (or client secret) is known only to the customer and will complement the assigned client ID. The combination of client ID and secret may be used as an authentication mechanism to ensure the validity of the customer. The secret should be sufficiently random, so it will not be guessable by third parties. To this end, the secret may use a cryptographically-secure library to generate a 256-bit value that may be converted to a hexadecimal representation.

Further, the microservice platform 10 is configured to allow the developer to update the user profile using a financial institution dashboard, as outlined below:

(a) User (i.e., cloud platform user) logs in to the profile using the "user name", "password", "client ID" and "secret";

(b) Allows provision for the user to update their information; and (c) Saves the information as updated by the user.

The dashboard is implemented in the microservice platform 10 to show prebuilt contents (services) or new contents defined in association with a respective microservice module for different domain fields.

Once registered as a cloud platform user of the microservice platform 10, the dashboard is adapted to allow the user to access one or more prebuilt contents (or services) of service module(s) for each of a plurality of domains when the user logins to the dashboard based on, e.g., a user name and a password. The one or more prebuilt contents are available for each of a plurality of domains.

FIG. 3A is an example of a visual representation of a microservice platform dashboard showing prebuilt intentions of an intention analysis module 60 according to an embodiment of the present disclosure.

Referring to FIG. 3A, prebuilt intentions 350 are shown on the dashboard as an example of the prebuilt contents. The intention analysis module 60 can be accessed by the cloud platform user to view all the prebuilt intentions 350 available for a domain to be selected.

Referring still to FIG. 3A, each intention includes fields such as name 310, description 320, keyword(s) 330, etc., and entities associated with the corresponding intention are shown. For example, entities of "date check" and "amount check" are shown to be associated with the intention whose name is "account balance" which will be determined in response to the receiving of keywords: e.g., "what is my account balance", "the balance in my account".

The domain selected with reference to FIG. 1 is "Retail Banking" (see reference numeral 113 of FIG. 1). The dashboard allows the cloud platform user to switch between various domains including: retail banking, wealth management, asset management, capital market, etc. to view specific intention(s) for each domain. Further, the dashboard allows the user to add a new custom domain. After defining a new custom domain, the user will be able to add new intention(s) to the newly defined domain.

For example, the dashboard of FIG. 3A can be understood as an intention keyword dictionary (e.g., also called as intention definition table) where intention names (e.g., 310) and descriptions can be looked up for a certain (intention) keyword input from the user query.

In addition, the dashboard allows the user to download the prebuilt intentions from the intention analysis module 60 and add a new intention thereto along with keyword utterances for a specific language and the associated entities. The steps for adding a new intention are outlined as follows:

(a) User logs in to the financial institutions (or bank) dashboard; and (b) After performing the login validation, present the financial institutions dashboard that will act as an interface for the user to define new intention(s).

Menus for accessing (or downloading) and adding a new intention are made available to the user, as shown with reference numerals 350 and 360 of FIG. 3A.

In addition, the dashboard allows the user to test and simulate the newly added intention by typing a potential user query and checking a JSON output result and a menu for doing this is made available, as shown with reference numeral 370 of FIG. 3A.

According to an illustrative embodiment of the present disclosure individual word listings can be updated as a corpus for the intentions as shown in FIG. 3B. This allows the system to be operated in an even more modular fashion.

Figure 4:
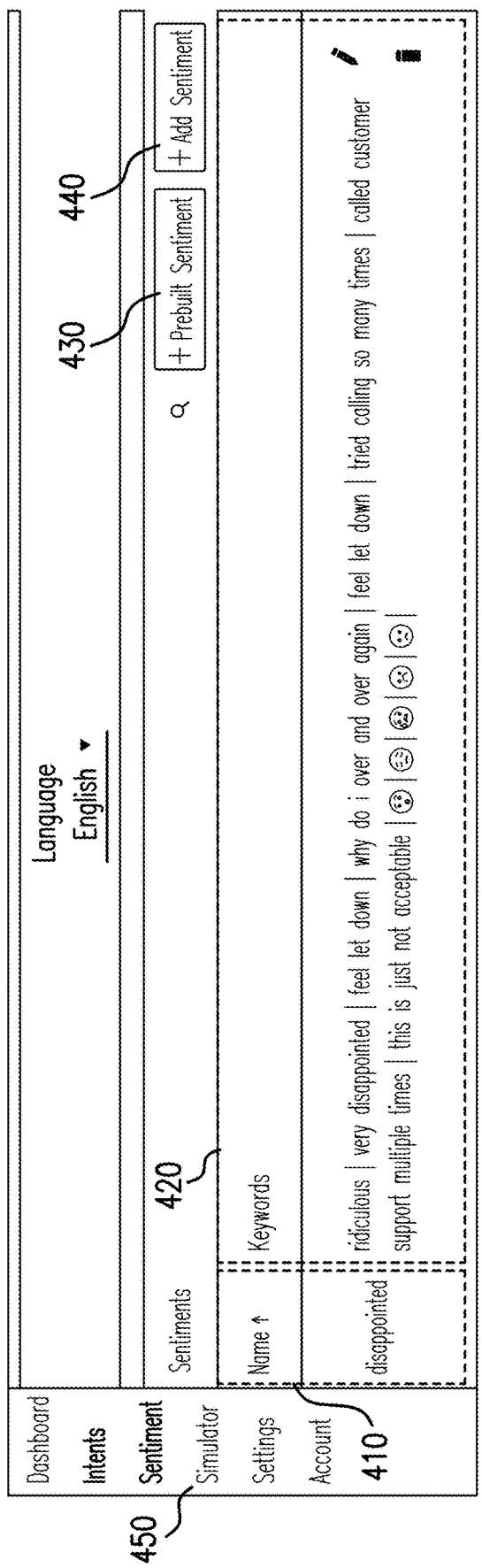
FIG. 4 is an example visual representation of a microservice platform dashboard showing prebuilt sentiments of a sentiment analysis module according to an embodiment of the present disclosure.

FIG. 4 is an example of a visual representation of a microservice platform dashboard showing prebuilt sentiments of a sentiment analysis module 50 according to an embodiment of the present disclosure.

Referring to FIG. 4, prebuilt sentiments 430 are shown on the dashboard as an example of the prebuilt contents. The sentiment analysis module 50 can be accessed by the user to view all the prebuilt sentiments 430 available for a domain to be selected.

FIG. 4 shows that according to the present illustrative embodiment, a sentiment includes name 410 (e.g., sentiment name) and keyword(s) 420, etc., although a description (not shown) may be added in the sentiment as a field if desired. It is shown from FIG. 4 that the sentiment is defined as "disappointed" for keywords such as "ridiculous", "very disappointed", "feel let down", "why do I over and over again", "I tried calling so many times", "I called client support multiple times", "this is just not acceptable", etc.

For example, the dashboard of FIG. 4 can be understood as a sentiment keyword dictionary (e.g., also called a sentiment definition table) where sentiment name(s) (e.g., 410) can be looked up for a certain (sentiment) keyword input from the user query.

The dashboard allows the user to switch between various domains including: retail banking, wealth management, asset management, capital market, etc. to view specific sentiments(s) for each domain (not shown). Further, the dashboard allows the user to add a new custom domain. After defining a new custom domain, the user will be able to add new sentiment(s) to the newly defined domain.

In addition, the dashboard allows the user to download the prebuilt sentiments from the sentiment analysis module 50 and add a new sentiment thereto along with keyword utterances for a specific language and the associated entities. The steps for adding a new sentiment are outlined as follows:

(a) User logs in to the dashboard; and
(b) After performing the login validation, present the financial institutions dashboard that will act as an interface for the user to define new sentiment(s).

Menus for accessing (or downloading) prebuilt sentiments and adding a new sentiment are made available to the user, as shown with reference numerals 430 and 440 of FIG. 4.

In addition, the dashboard allows the user to test and simulate the newly added sentiment by typing a potential user query and checking a JSON output result and a menu for doing this is made available, as shown with reference numeral 450 of FIG. 4.

Once registered as the cloud platform user (e.g., developer) of the microservice platform 10, the user will select a certain service module(s) from the service modules 20 to 80 by calling appropriate API(s) 90.

In one embodiment, the API(s) may be Representational State Transfer (REST) APIs where the cloud platform user (or built client support application) can invoke the APIs and send the appropriate parameters (e.g., input parameters) to the service modules and obtain a JavaScript Object Notation (JSON) output that can then be used by the client support application or other service modules to apply the JSON output on top of client data present across the various domains (e.g., private banking 111, retail banking 113, asset management 112, wealth advisory 114, trading platform 115, etc.). The client data represents banking data (e.g., account and transactional information) that the financial institution stores within their databases.

Figure 5A:
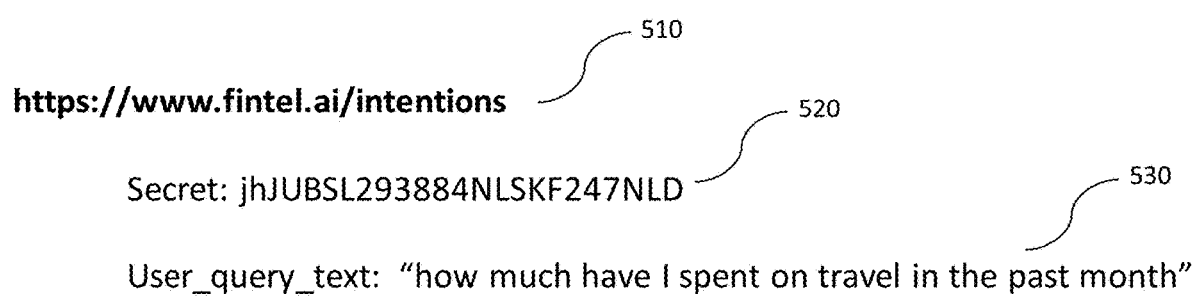
FIG. 5A is a diagram of an example application program interface (API) endpoint corresponding to an intention analysis module according to an embodiment of the present disclosure.

For example, if the user (or built client support application) would like to invoke the intention analysis module 60, the user (or built client support application) may call the API endpoint corresponding to the intention analysis module 60. Referring back to FIG. 1, the API endpoint (e.g., 916) where the user (or built client support application) can invoke the API pertaining to the intention analysis module 60 is made available. An example of the API endpoint corresponding to the intention analysis module 60 is depicted in FIG. 5A. Referring to FIG. 5A, a uniform resource identifier (URL), secret and user query in text are shown with reference numbers 510, 520 and 530, respectively.

In one embodiment, the API call may be validated to authenticate the user. Once the API call has been validated, the output of the call is provided as a JSON output which in turn can be utilized by the developer in a way that will help the developer build or enhance new client support applications. An example of the JSON output is depicted in FIG. 5B. For input parameters such as query ID, query type, language, user query in text, output parameters such as intent name identifying an intention to the user query, domain, matching phrase—a phrase which was a basis for determining the intention, confidence score, etc. are shown in FIG. 5B. In case multiple JSON outputs are provided from a certain service module in response to determination of multiple entities to the user query, the respective output parameters of the JSON output responses are aggregated and a JSON payload is created for the invoked API endpoint. Further, the JSON payload is rendered as a RESTful endpoint to be used by the developer or the built client support application to apply the JSON payload to the client data across the various domains.

It is noted that APIs corresponding to all other microservice modules can be invoked in substantially the same manner that will allow the developer (or built client support application) to call the respective endpoints and obtain the JSON payload that can be used for building new client support applications (or for the built client support application to use the JSON payload as a basis for further processing on the client data.

It is noted that one or more of the above actions or tasks defined by the developer are intended to be performed in substantially the same manner by the built client support application.

Referring back to FIG. 1, the NLP/NLU modules 20 allow human beings or machines (or devices) to interact with each other using natural language as opposed to keywords and codes. These features are implemented based on different underlying system architectures such as machine learning, deep learning neural networks, etc. The NLP module is a quantitative, statistical, data-driven form of language processing that is based on approximation and probability estimations. The NLU module builds upon the NLP module by adding a qualitative, linguistic approach to language processing. Together the NLP module with NLU module (i.e., NLP/NLU module 20) allows machines to read and understand languages input from human beings and enables the machines to understand user intent(s) and have fluid conversations.

The NLP/NLU modules 20 may be a hardware or software component that is configured, designed, and/or programmed to perform the above-mentioned tasks and actions.

In addition, as a part of the cloud's machine learning (ML) models as-a-service, ML module 40 leverages algorithms that allow the client support applications to become more accurate in predicting outcomes given a set of parameters and will use real time data to derive the predicted outcome. The ML module 40 can receive input data from a user, other connected service modules (e.g., intention analysis module, sentiment analysis module, conversational intelligence module, one-demand analytics module, etc.), or applications and use statistical models to predict an output and keep revising the output with new input data. The Ml module 40 allows the system (or built client support application) to learn from data, identify patterns and make decisions with minimal human intervention.

The following describes mechanisms for defining machine learning models.

As a first step, financial institutions will register as a cloud platform user of the cloud microservice platform 10. This is a prerequisite for accessing the services related to the cloud ML module.

According to an illustrative embodiment, the cloud platform user (e.g., developer) can develop his/her own custom ML models using any of the development tools such as PostgresSQL, Python, Django, C++, etc. The developed ML models will be attached to (or associated with) a corresponding one of intentions being defined in the intention analysis module 60 (as will be described later), so that when there is a match for an intention, the ML model associated with the matched intention will automatically be invoked.

In another embodiment, dynamic structured query language (SQL) query models can be defined along with the associated conditions in order to dynamically generate a well-formed SQL query on the fly that can be applied on top of the client's structured data to generate results. The advantage of this approach would be that any changes to the ML model will automatically propagate to all devices without having to redeploy the software for the various form factors.

Figure 6:
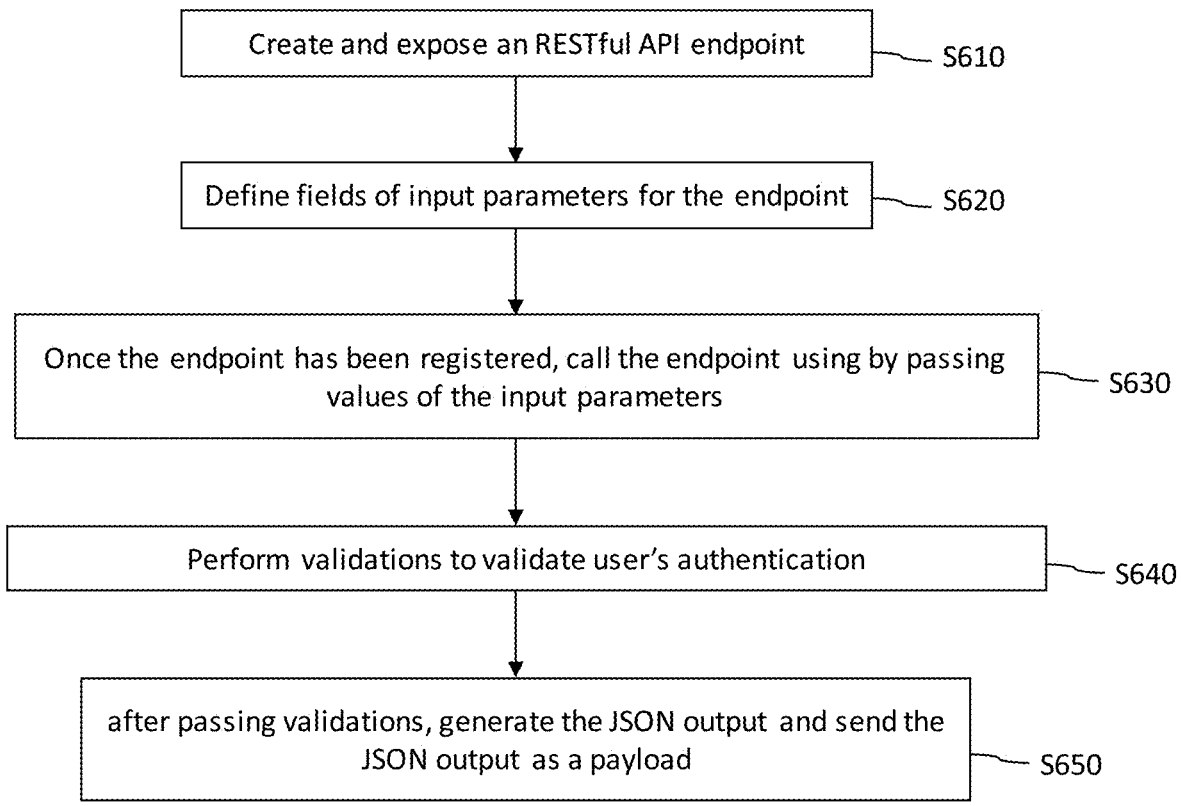
FIG. 6 depicts a flow chart of a method for calling a machine learning (ML) module via an ML API endpoint during development phase of a client support application according to an embodiment of the present disclosure.

Described below is a mechanism as to how the built client support application built can access the ML module 40 via an appropriate API endpoint (e.g., 914 of FIG. 1). In a development phase, the developer can access the API endpoint directly through a RESTful API call as opposed to logging in to the financial institution dashboard portal. FIG. 6 depicts a flow chart of a method for calling the ML module 40 via the ML API endpoint during the development phase of the client support application.

In step S610, a RESTful API endpoint pertaining to the ML module 40 is created on a web server implemented in the microservice platform 10 and/or an external web server in a manner that will help the developer to call the ML service, and the created API endpoint is adapted to be exposed to e.g., the client support application.

In step S620, fields of input parameters for the endpoint are defined. The input parameters fields include, but are not limited to: client ID, secret, query text, query mode, device type, query language, etc.

In step S630, once the endpoint has been registered, the ML endpoint is called using a RESTful client (e.g., the client support application) by passing actual values of the input parameters to the ML API of the microservice platform 10. The ML API of the microservice platform 10 calls the ML module 40 based on the input parameter values.

In step S640, the ML module 40 performs validations to validate the authentication of users (e.g., developer or user to the built client support application).

In step S650, after passing validations, the ML module 40 generates a JSON output response and sends the JSON output response as a payload to the microservice platform 10, other service modules (e.g., 20, 30, and 50 to 80 of FIG. 1), and users (e.g., developer or user to the built client support application) via the endpoint.

Figure 7:
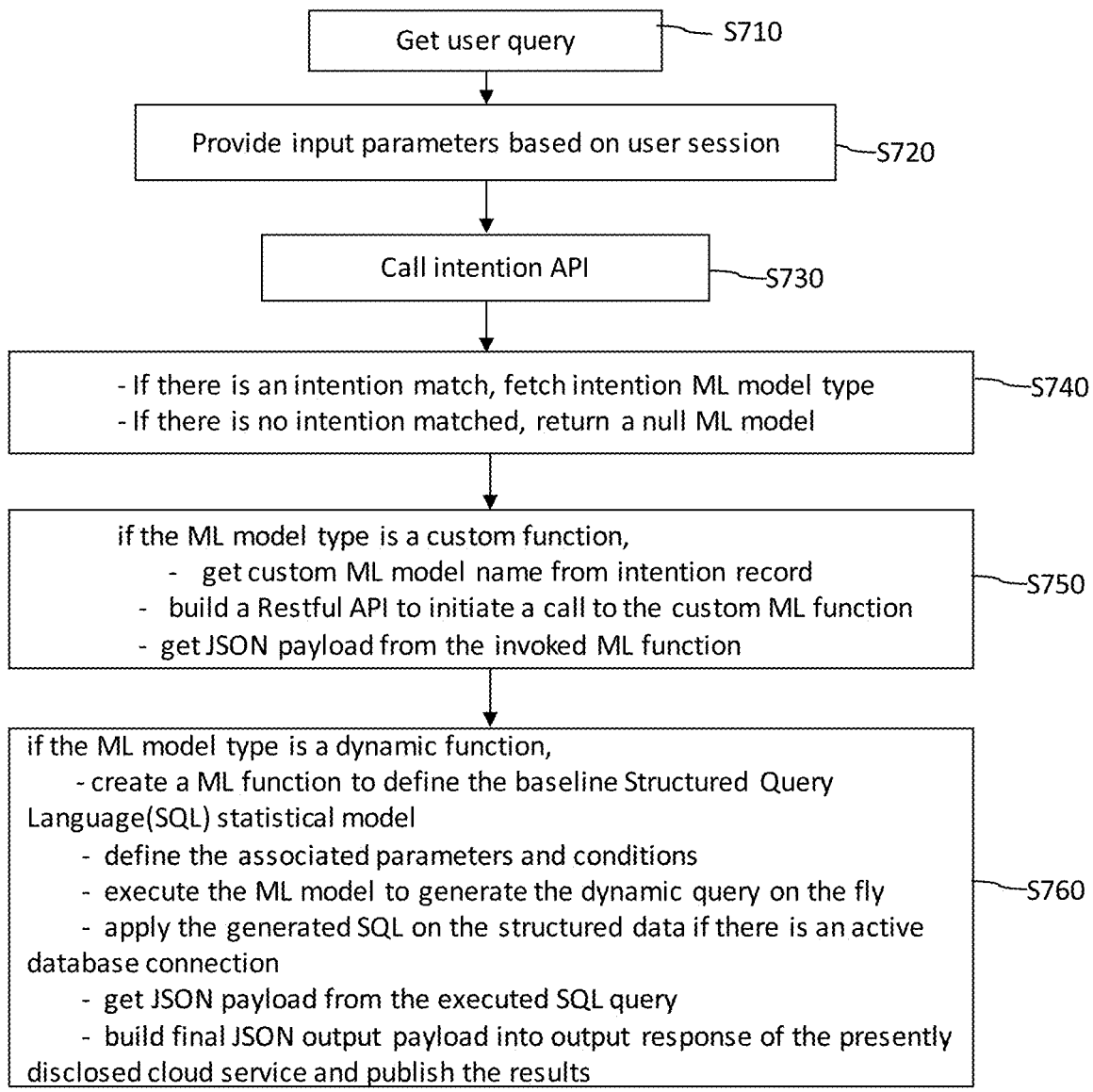
FIG. 7 depicts a flow chart of a method of how the ML module works in communication with the client support application to be identified in association with an intention on the fly according to an embodiment of the present disclosure.

FIG. 7 depicts a flow chart of a method of how the ML module 40 works in communication with the client support application to be identified in association with an intention on the fly according to an embodiment of the present disclosure. For example, the method of FIG. 7 pertains to how the ML module 40 is called by the client support application which has been built, a user interface of which has been installed in a form factor (e.g., client interface device 120 of FIG. 1) so as to work to provide services defined therein.

Referring now to FIG. 7, the method commences with getting a user query provided via the form factors at client ends (S710).

Further, values of the input parameters are provided based on user sessions (S720). The input parameters include, but are not limited to: client ID, secret, query text, query mode, device type, query language, etc. The client ID refers to an ID of the cloud platform user (e.g., developer). The secret refers to the cloud platform secret for the registered platform user. The query text refers to a user query that will be used for deriving the intention. The query mode indicates if the user (e.g., user of the client support application) used voice or text. The device type indicates the form factor at client ends (e.g., iOS, Android, connected card, Alexa, Google Assistant). The query language refers to the language in which the client support application user has asked the query. The ML API is called using a secure RESTful endpoint (e.g., https:mybank.fintel.ai/get_ml_model).

In step S730, the intention API is called to obtain an intention from the user query.

In step S740, if there is an intention match, a certain ML model type or ML model appropriate to the intention matched is fetched. In other words, every intention has an associated ML model that will be invoked when there is an intention match. If there is no intention matched, a null ML model is returned.

In step S750, if the ML model type is a custom function (e.g., ML Model Type='custom_function'), the custom ML model name (e.g., ML_function_to_invoke) is obtained from the intention record which may be stored in the intention analysis module 60. In this case, a Restful API can be built to initiate a call to the custom ML function using a GET or a POST method; and the JSON payload is obtained from the invoked ML function.

In situations where bank customers have their own existing analytical models or ML models developed in house, they may prefer to re-use these functions. In such cases, they will create a new internal https endpoint (if it already does not exist) so that the endpoint can be called using a RESTful API call. This endpoint can be attached to the intention record so that it automatically gets invoked using a GET or POST method. In case of a GET method, used by the client, the parameters will have to be embedded into the endpoint directly (e.g: http://www.bankabc.com/getportfoliomix?uid=&user_id) but in case of a POST method, the parameters will be passed separately.

In step S760, if the ML model type is a dynamic function (e.g., ML Model Type='dynamic_ml_query'), an ML function to define the baseline Structured Query Language (SQL) statistical model is created; the associated parameters and conditions are defined; the ML model is executed using the defined associated parameters and conditions to generate the dynamic query on the fly; the generated SQL (e.g., the generated dynamic query) is applied on the structured data if there is an active database connection; the JSON payload is obtained as a result of executing the SQL query through the ML model; and the final JSON output payload is built into the output response of the presently disclosed cloud service and publish the results (e.g., JSON output response). An example JSON output format from the ML module 40 will be shown in FIG. 8.

For example, the dynamic function itself can be programmed in such a way that the ML/Analytical model can be generated as a dynamic SQL that will get applied on top of a structured data (or in some cases unstructured data as well). For example, if a Risk Assessment Score needs to be generated on the fly for a Credit Underwriting process, a dynamic ML model can be written that will generate a 'Risk Assessment' SQL construct on the fly and run it on the database to generate a score.

The structured data refers to the data stored in the Banks database such as Accounts, Transactions, Portfolio, Risk Factors, etc. The database may contain the finance-related structured data.

It is noted that "custom function(s)" can be developed by financial institutions and be invoked directly as part of the intention processing to generate a meaningful response for the user while "dynamic function(s)" is a function developed using the SQL methodology where the functions each will have four components: (a) 'Baseline SQL query' that will have the construct for analysis; (b) 'SQL Where' condition that will add the parameter values; (c) 'SQL Group By' which will group information if an aggregation needs to be done; and (d) 'SQL Order By' for ordering and showing information in a specific way. With this construct, dynamic run time queries can be generated on the fly for the function which can be executed on the database to generate a data set. The other important difference between the custom function and the dynamic function is that custom function can be written in any programming language and can be exposed as an endpoint, but the dynamic function can be written only in SQL programming languages that can be executed on the database.

In one embodiment, the ML module 40 may be a hardware or software component that is configured, designed, and/or programmed to perform the above-mentioned tasks and actions.

In addition, as a part of the cloud's sentiment analysis as-a-service, the sentiment analysis module 50 mines text from chat conversations contextually and identifies and extracts subjective information in source material, and helps financial institutions to understand the sentiment of their end users. Financial institutions can leverage this module to quickly understand client attitudes and react accordingly by offering more products/services. More particularly, the sentiment analysis module 50 can be used to define the potential sentiments of the user along with the associated keyword utterances. For example, a sentiment such as "dissatisfied" can be defined with associated keywords utterances such as 'not able to get through, trying hard, tried multiple times'. When the user uses any of the utterances, the sentiment is picked up to assume that the user is not satisfied with something.

According to an illustrative embodiment, the sentiment analysis module 50 may be a hardware or software component that is configured, designed, and/or programmed to determine a user's sentiment when the user requests a service with a query. In order to determine the user's sentiment, the sentiment analysis module 50 is configured to: conduct a pattern matching to sentiment keywords utterances, word alternations and emojis/emoticons/gifs (collectively referred to as keywords) input by the user in the query to determine a particular sentiment in order to come up with a final analyzed sentiment. Financial institutions can use this module as-a-service to obtain the sentiment of the user, and based on the response provided by the module 50, they can apply it to enrich end client experience by providing various dynamic responses based on the sentiment identified. This will lead to a better client experience and a more empathetic response resulting in client satisfaction.

Figure 9:
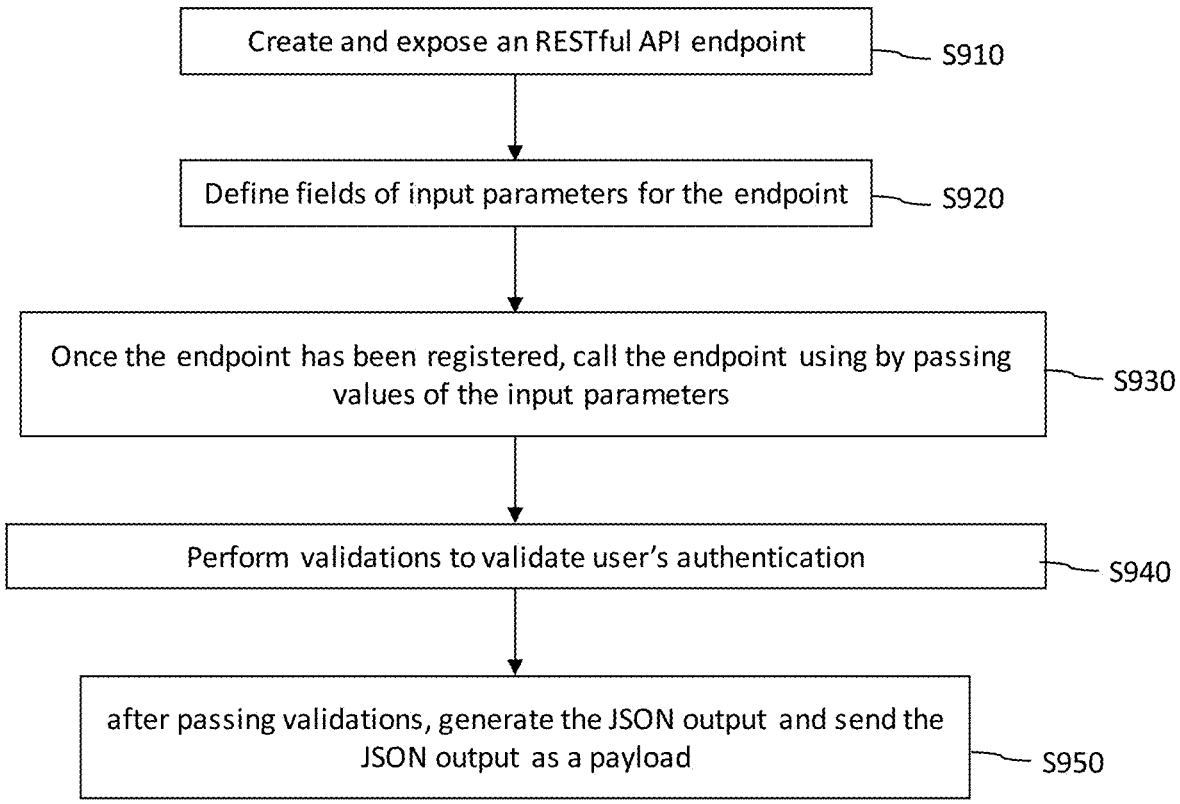
FIG. 9 depicts a flow chart of a method for calling a sentiment analysis module by invoking a sentiment API endpoint during the development phase of the client support application.

Described below is a mechanism depicting how the client support application built by financial institutions can access the sentiment analysis module 50 via an API Endpoint (e.g., 915 of FIG. 1). In a development phase, the application developer can access the API endpoint directly through a RESTful API call as opposed to logging in to the financial institution dashboard portal. FIG. 9 depicts a flow chart of a method for calling the sentiment analysis module 50 by invoking the sentiment API endpoint during the development phase of the client support application.

In step S910, a RESTful API endpoint pertaining to the sentiment analysis module 50 is created on a web server implemented in the microservice platform 10 and/or an external web server in a manner that it will help the developer to call the sentiment analysis service, and the created API endpoint is adapted to be exposed to e.g., the client support application.

In step S920, fields of input parameters for the endpoint are defined. The input parameters fields include, but are not limited to: client ID, secret, query text, user ID, query mode, device type, query language, etc.

In step S930, once the endpoint has been registered, the sentiment analysis endpoint is called using a RESTful client (e.g., the client support application) by passing values (or contents) of the input parameters to the sentiment analysis API of the microservice platform. The sentiment analysis API of the microservice platform 10 calls the sentiment analysis module 50 based on the input parameters.

In step S940, the sentiment analysis module 50 performs validations to validate the authentication of users (e.g., developer or user to the built client support application).

In step S950, after passing validations, the sentiment analysis module 50 generates a JSON output parameters and sends the JSON output parameters as a payload (or response) to the microservice platform 10, other service modules (e.g., 20 to 40 and 60 to 80 of FIG. 1), and users (e.g., developer or user to the built client support application) via the API endpoint (e.g., 915 of FIG. 1).

Figure 10A:
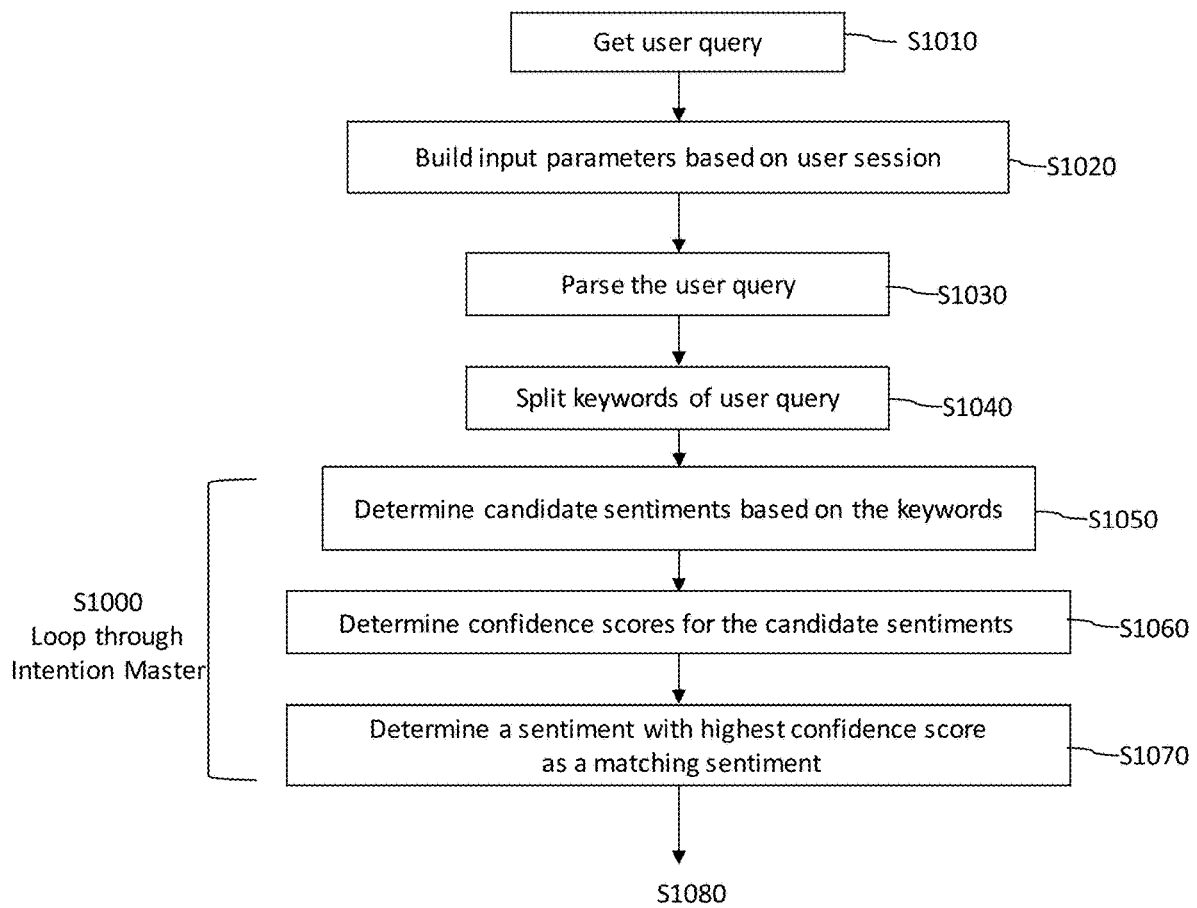
FIGS. 10A and 10B depict a flow chart of a method of how the sentiment analysis module works in communication with the client support application to determine a user's sentiment and next actions to be conducted for the determined user's sentiment according to an embodiment of the present disclosure.
Figure 10B:
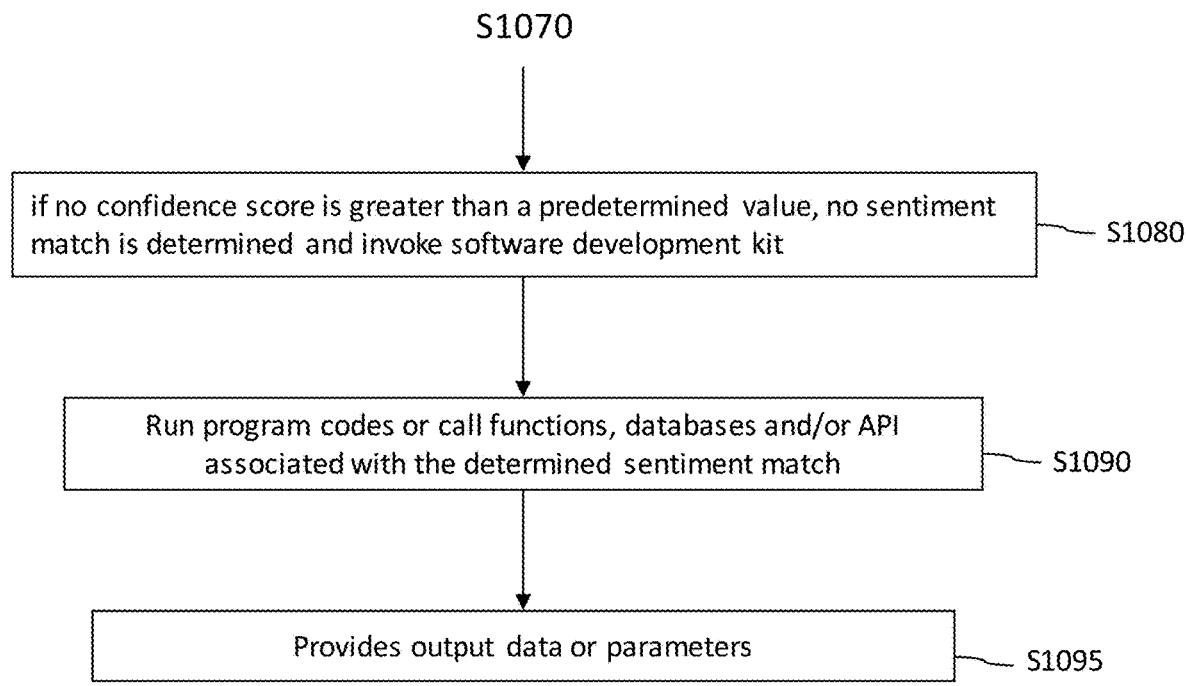

FIGS. 10A and 10B depict a flow chart of a method for describing how the sentiment analysis module 50 works in communication with the client support application to determine a user's sentiment and next actions to be conducted for the determined user's sentiment according to an embodiment of the present disclosure. For example, the method of FIGS. 10A and 10B is related to how the sentiment analysis module 50 is called by the client support application which has been built.

Referring now to FIG. 10A, the method commences with getting a user query provided via the form factors at client ends (S1010).

Further, values of the input parameters are provided based on user sessions (S1020). The input parameters include, but are not limited to: user ID, query language, query mode (voice or text), query source (source device), or the like.

The sentiment analysis API is called using a secure RESTful endpoint (e.g., https:mybank.fintel.ai/sentiment), and a sentiment master model in the database is performed.

As depicted in FIGS. 10A and 10B, the performing of the sentiment master model further includes: parsing the user's query (S1030); splitting keywords (e.g., utterances) to store, for example, in an array, into memory (not shown) (S1040); running a sentiment pattern matching function for the stored split keywords to determine how many sentiment keywords are matched against database (e.g., prebuilt sentiments 430 of FIG. 4) created for financial institution as part of the cloud system and determine candidate sentiments (S1050); and determine respective confidence scores for the candidate sentiments (S1060).

Figure 11A:
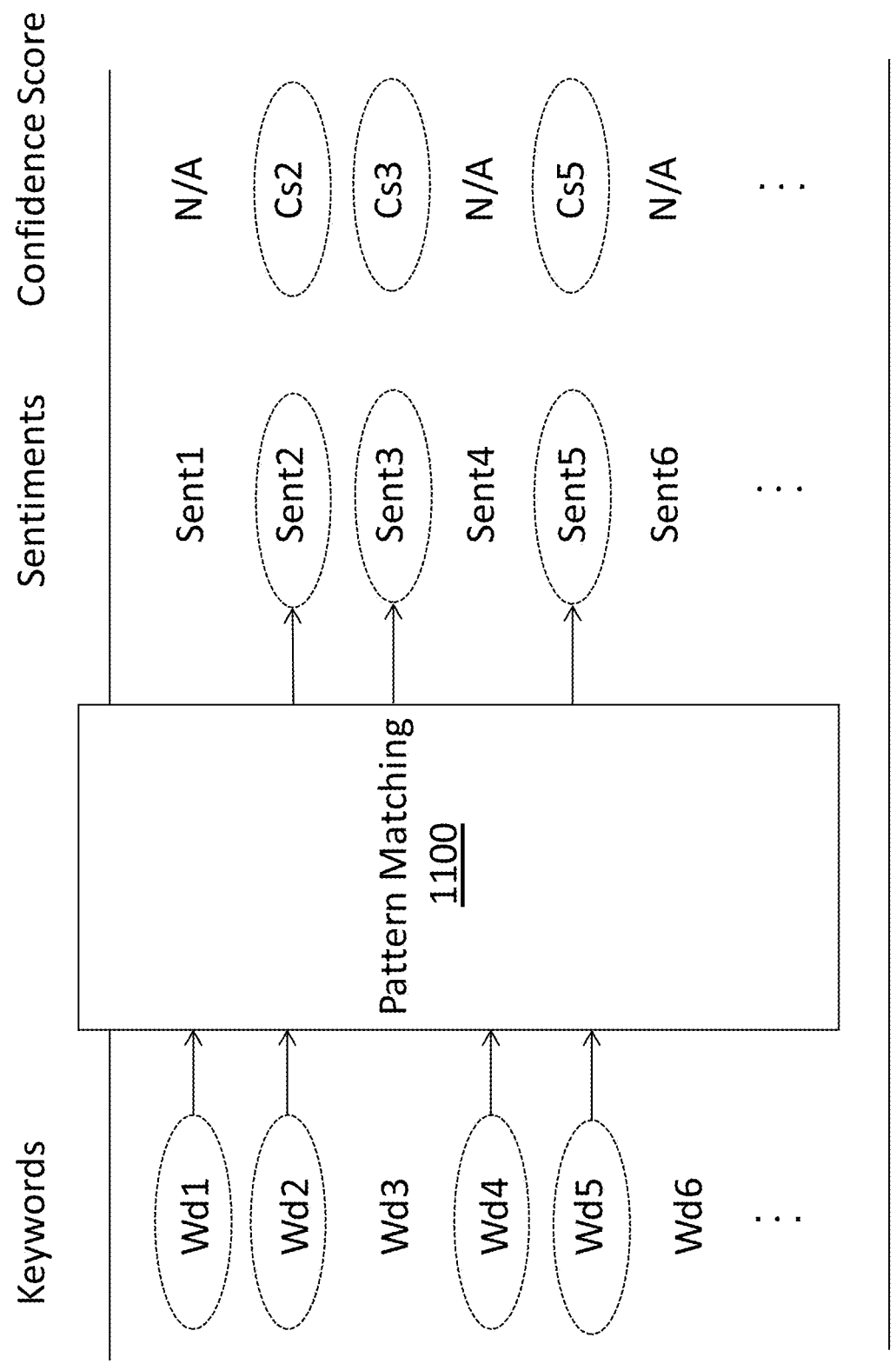
FIG. 11A depicts example matching relationships of keywords with respective sentiments according to an embodiment of the present disclosure.
Figure 12:
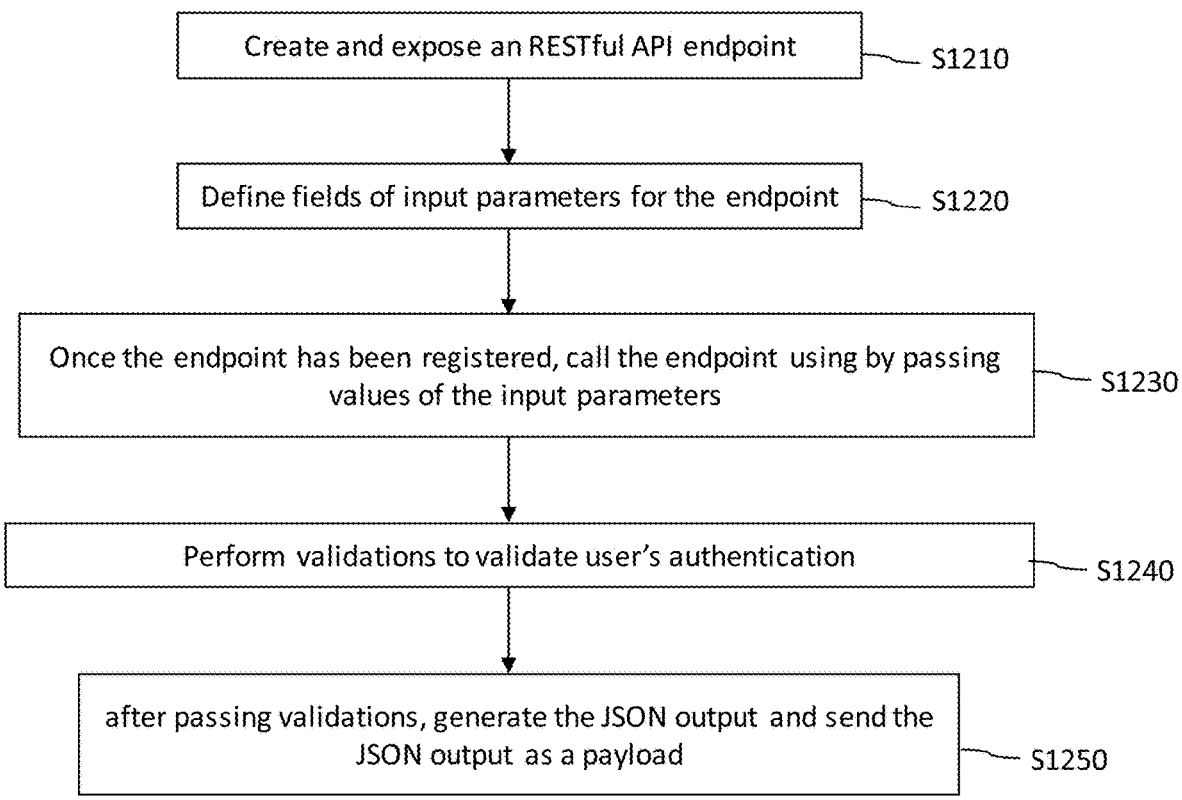
FIG. 12 depicts a flow chart of a method for calling an intention service module by invoking an intention API endpoint during the development phase of the client support application.

Examples of matching relationships of the keywords with respective sentiments are depicted in FIG. 11A. In addition, the example respective confidence scores determined for the candidate sentiments are also depicted in FIG. 12.

Referring now to FIG. 11A, the sentiment analysis pattern matching function 1100 is configured to perform a pattern matching for a set of keywords inputted Wd1, Wd2, Wd4 and Wd5 to determine one or more candidate sentiments Sent2, Sent 3 and Sent 5. The pattern matching function 1100 may also determine confidence scores Cs2, Cs3 and Cs5 corresponding to the candidate sentiments Sent2, Sent 3 and Sent 5, respectively.

Further, referring back to FIG. 10A, in step S1070, a sentiment with the highest confidence score is determined from among the candidate sentiments Sent2, Sent 3 and Sent 5. For example, if the confidence score Cs3 of the sentiment Sent3 is greater than any of the confidence scores Cs2 and Cs5 of the sentiments Sent2 and Sent5, the sentiment Sent3 can be determined as a matching sentiment of the user.

Figure 11B:
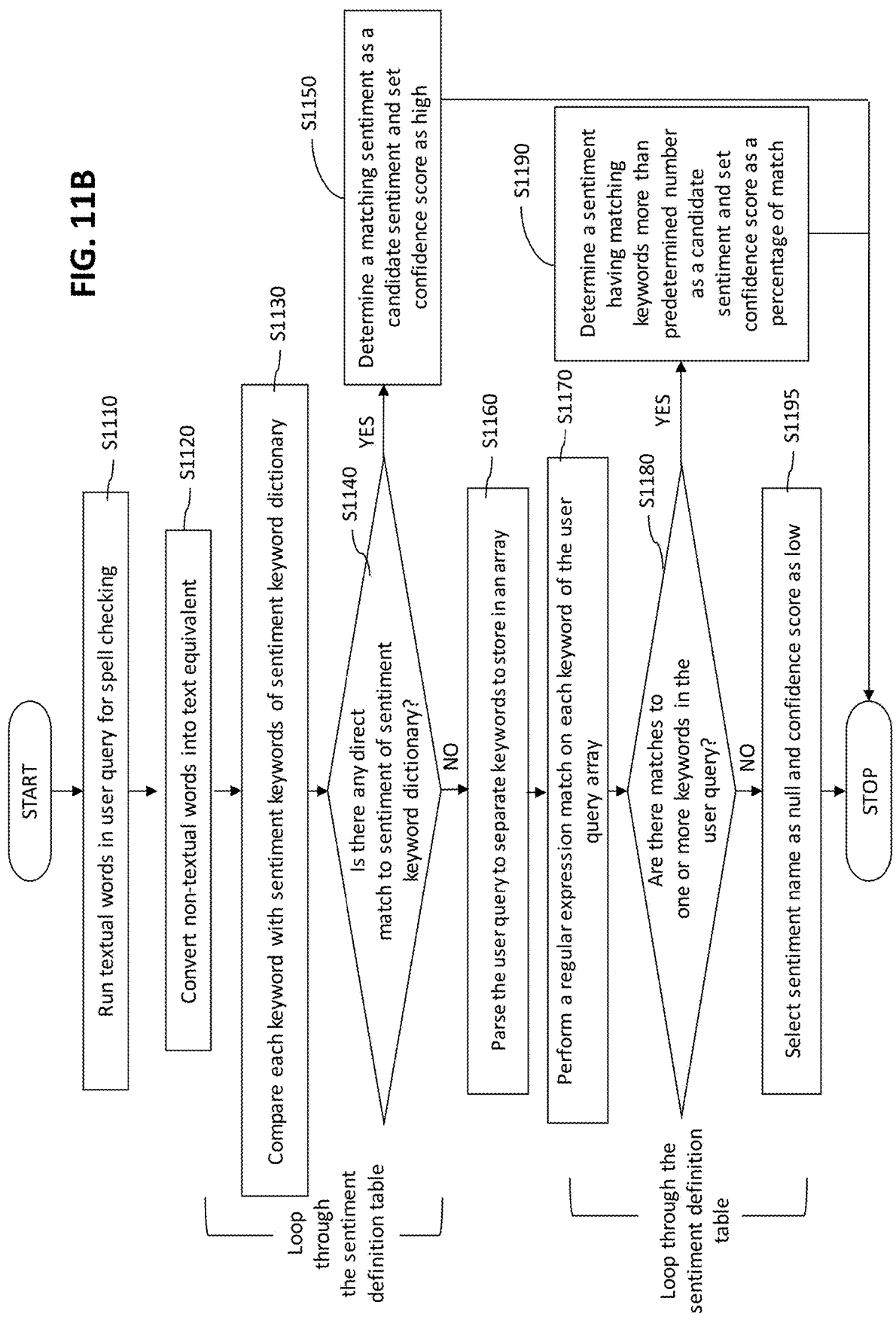
FIG. 11B depicts a flow chart for a sentiment analysis pattern matching function according to an embodiment of the present disclosure.

Referring to FIG. 11B illustrating a flow chart for the sentiment analysis pattern matching function 1100, all textural keywords (e.g., words which are not emojis/emoticons/gifs words) in the user query are run for spell check through, e.g., a third-party spell check API to ensure the words are corrected for spelling (S1110).

Next, the non-textual keywords such as emojis/emoticons/gifs are converted into texts equivalent thereto (S1120). For example, a smile icon will be converted to ':smile:'

In addition, each keyword of the user query is compared with a respective one of the sentiment keywords of the sentiment keyword dictionary (see e.g., FIG. 4) (S1130) and determine whether there are any direct pattern matching therebetween (S1140). For example, step S1130 can be performed by using a regexp_matches_hash function (POSIX). If a direct match is found between a certain keyword of the user query and a sentiment keyword of the sentiment keyword dictionary (YES), a sentiment (e.g., 410 of FIG. 4) that is mapping to the sentiment keyword of the sentiment keyword dictionary is determined as a candidate sentiment and a confidence score to the determined candidate sentiment is set as 'high' (e.g., 90% out of 100%) (S1150). If no direct match is found between any of keywords of the user query and a sentiment keyword of the sentiment keyword dictionary (NO), the keywords of the user query are separated and stored in an array (S1160).

Next, in step S1170, a regular expression is performed on the user query array to see if there is a regular expression match (e.g., regexp_match) to keywords of the user query. If a regular expression match is found to one or more keywords in the user query (YES), a certain sentiment having matching keywords more than a predetermined number is determined as a candidate sentiment and a confidence score to the determined candidate sentiment is set as a percentage of match (S1190); in some examples, a sentiment having most matching keywords is determined as a candidate sentiment and a confidence score to the determined candidate sentiment is set as a percentage of match. If no regular expression match is found to any keyword in the user query (NO), the sentiment name is selected as 'null' and a confidence score is set as low (S1195). For example, no candidate sentiment may be determined in step S1195.

In one embodiment, one or more entities associated with the determined sentiment are selected from memory (e.g., database). In addition, a function corresponding to the determined at least one entity is called to provide an output parameter. A response including the output parameter is built and output, using the sentiment analysis API, the built response to the microservice platform or other service modules in communication with the microservice platform using another one or more APIs.

Further, if no confidence score is greater than a predetermined value (e.g., 12), it may be determined that there is no sentiment match and a software development kit (e.g., StanfordCoreNLP SDK) is invoked by (a) setting "annotators", "outputFormat", "timeout" properties for the API call and (b) fetching the sentiment from the invoked SDK using the sentiment analysis API call (S1080).

Depending on sentiment being determined, the sentiment analysis module 50 may run program codes or call databases, functions and/or APIs to obtain data corresponding to output parameters (e.g., JSON output) (S1090 and S1095).

In addition, financial institutions can leverage the intention analysis module 60 to build support for multiple banking domains allowing the system to predict a user's intention based on his/her text utterance. This intention represents a task or action the user wants to do, such as "Check my account balance".

In one embodiment, the intention analysis module 60 may be a hardware or software component that is configured, designed, and/or programmed to determine a user intention when the user requests a service with a query. In order to determine the user's intention, the intention analysis module 60 is configured to: conduct a pattern matching to the keywords input by the user in the query to determine confidence scores calculated for respective candidate intentions based on utterances and word alternations; and determine an intention match based on the determined confidence scores. If a match is found for a particular intention, the intention analysis module 60 is configured to process next steps with the determined intention. For example, the match for the intention is determined if a confidence score falls within a threshold, and/or if the confidence score of such intention is the highest among those of other candidate intentions.

Financial institutions can use the intention analysis module 60 as-a-service to obtain the user's intention, and based on a response provided by the intention analysis module 60, they can apply it to development of new applications or enhancing existing applications to enrich end client experience.

As a part of a master definition, for example, all applicable intentions and the associated keyword utterances (seed words) are defined; financial services domain to which each intention applies are defined; entities and contexts for each intention are defined; and backend database functions or APIs to be called in the event of a match being found for each intention are defined.

Described below is a mechanism as to how the client support application built by financial institutions can access the intention analysis module 60 via an API Endpoint (e.g., 916 of FIG. 1). In a development phase, the application developer can access the API endpoint directly through a RESTful API call as opposed to logging in to the financial institutions dashboard portal. FIG. 12 depicts a flow chart of a method for calling the intention analysis module 60 by invoking the intention API endpoint during the development phase of the client support application.

In step S1210, a RESTful API endpoint is created on a web server implemented in the microservice platform 10 and/or an external web server in a manner that it will help the user call the Intention service and the created API endpoint is adapted to be exposed to the application developer or the client support application.

In step S1220, fields of input parameters for the endpoint are defined. The input parameters fields include, but are not limited to: client ID, secret, query text, user ID, query mode, device type, query language, etc.

In step S1230, once the endpoint has been registered, the intention endpoint is called using a RESTful client (e.g., the client support application) by passing values (or contents) of the input parameters to the intention API of the microservice platform. The intention API of the microservice platform 10 calls the intention analysis module 60 based on the input parameters.

In step S1240, the intention analysis module 60 performs validations to validate the authentication of users (e.g., developer or user to the built client support application).

In step S1250, after passing validations, the intention analysis module 60 generates a JSON output parameters and send the JSON output parameters as a payload (or a response) to the microservice platform 10, other service modules (e.g., 20 to 50 and 70 to 80 of FIG. 1), and users (e.g., developer or user to the built client support application) via the API endpoint (e.g., 916).

Figure 13A:
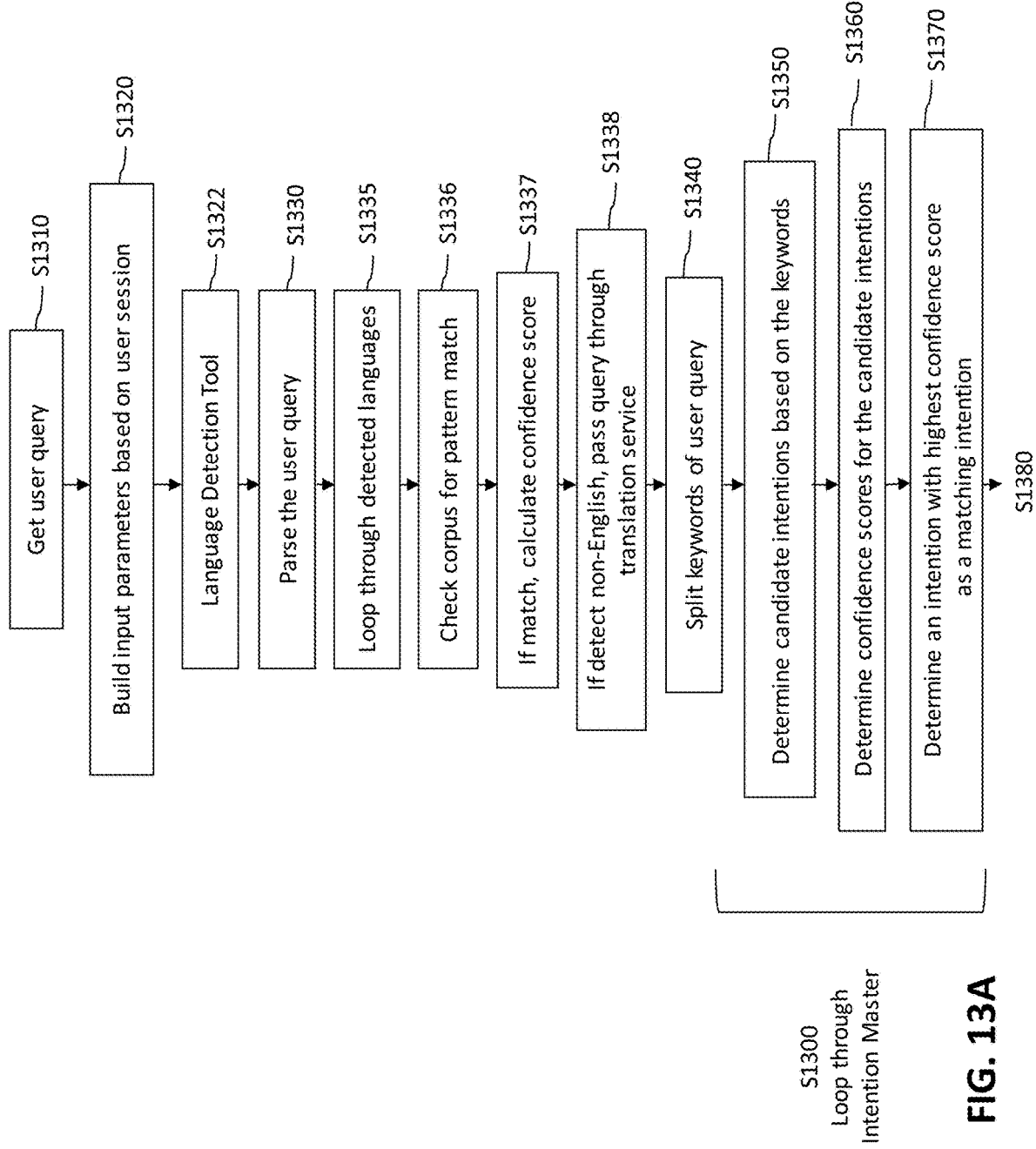
Figure 13B:
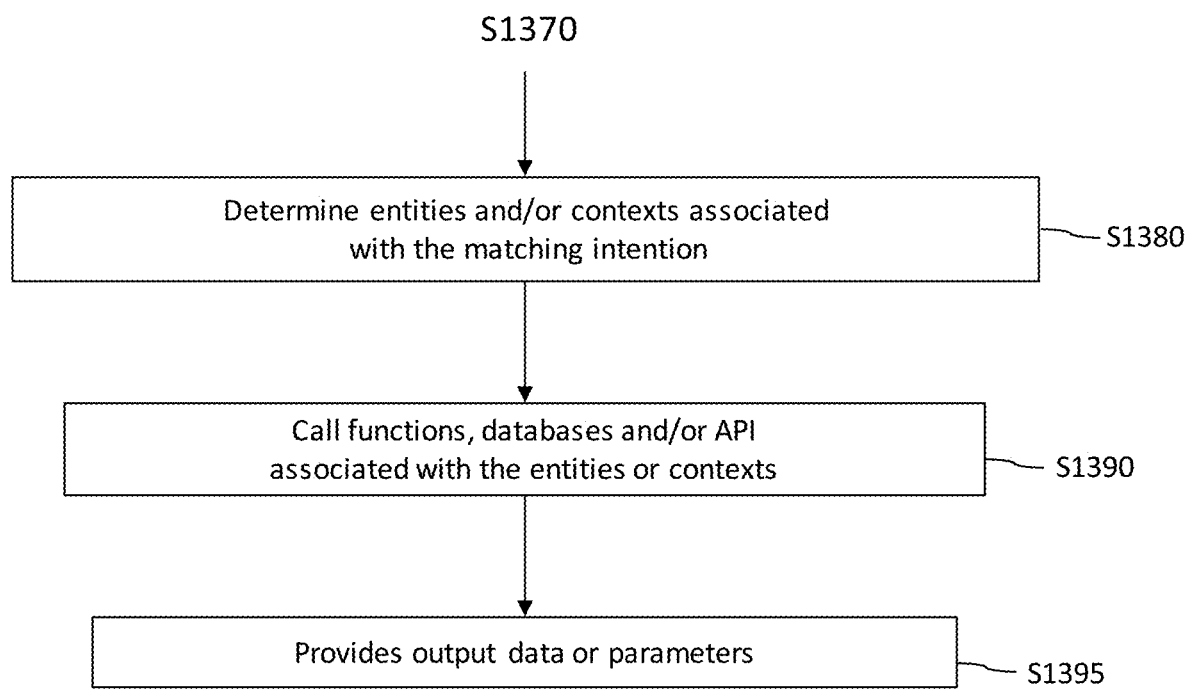

FIGS. 13A and 13B depict a flow chart of a method of how the intention analysis module 60 works in communication with the client support application to determine a user's intention and next actions to be conducted for the determined user's intention according to an embodiment of the present disclosure. For example, the method of FIGS. 13A and 13B depicts how the intention analysis module 60 is called by the client support application which has been built.

Referring now to FIG. 13A, the method commences with getting a user query provided via the form factors at client ends (S1310).

Further, values of the input parameters are provided based on user sessions (S1320). The input parameters include, but are not limited to: user ID, query language, query mode (voice or text), query source (source device), or the like. The intention API is called using a secure RESTful endpoint (e.g., https:mybank.fintel.ai/intention), and an intention master model in the database is performed.

Illustrative embodiments of the present disclosure may include a language detection tool for detecting and identifying a language or languages used in a query in the event the query language is not included in the input parameters (S1322). Although only described herein with respect to the intention master model, the language detection tool may be readily provided with respect to the other models described herein including, for example, the sentiment analysis model, etc.

As depicted in FIGS. 13A and 13B, the performing of the intention master model (S1300) further includes: parsing the user query (S1330) and splitting keywords (e.g., utterances) to store, for example, in an array, into memory (not shown) (S1340). A language detection loop is then performed (S1335) which includes checking an intent-dialect-language corpus to see if there is a pattern match for the matching keyword utterances and word listing training keywords (S1336). If a match is found, a confidence score for the intention is calculated (S1337). If any non-English languages are detected, the user query is passed through a translation service to translate the text to English (S1338). For the translated query, a pattern matching function is run for the stored split keywords to determine how many keyword utterances are matched against database (e.g., prebuilt intentions 350 of FIG. 3) created for the financial institution as part of the cloud system and determine candidate intentions (S1350); and determine respective confidence scores for the candidate intentions (S1360).

In order to support multiple languages and the various dialects of the languages, users will have the ability to define new Dialects and train the system by attaching keyword utterances and word listings for a combination of Intention, Dialect and the Language. This is achieved by defining all dialects that will be used by the user base of, for example, the banking institution. The dialect definition may be done from within the Cloud Configuration portal. An example of a dialect definition according to an illustrative embodiment is shown in FIG. 13C. The dialect definition includes a Dialect Code 372 and corresponding Dialect Description 374. Dialects may be added as desired by selecting Add Dialect button 373. Once the master set of dialects have been defined, the user (e.g., the banking institution) can train the system to feed in the different ways in which a user could ask the question in a particular dialect. This can be achieved utilizing the Cloud configuration portal to define "Intent Dialects". In this way, all the keyword utterances and word listings will be captured for the intention and the dialect. FIG. 13D depicts an example of how a training model may look according to an illustrative embodiment of the present disclosure. The training model includes the Intent 376, the Dialect 377, the Keyword Utterances 378 and the Word Listing 379.

Figure 14A:
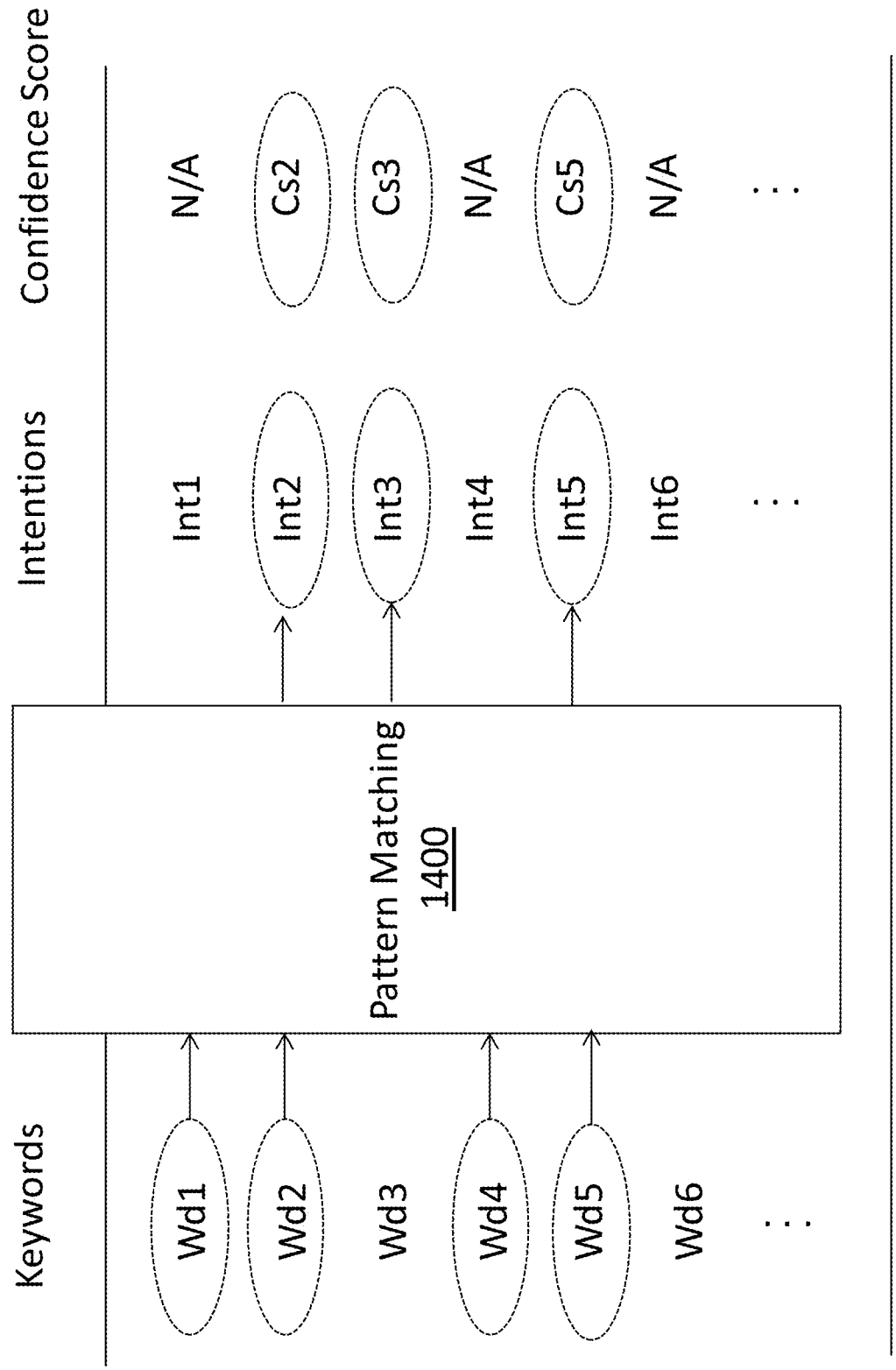
FIG. 14A depicts example matching relationships of keywords with respective intentions according to an embodiment of the present disclosure.

Example matching relationships of the keywords with respective intentions are depicted in FIG. 14A. In addition, the example respective confidence scores determined for the candidate intentions are also depicted in FIG. 14A.

Referring now to FIG. 14A, the pattern matching function 1400 is configured to perform a pattern matching for a set of keyword utterances inputted Wd1, Wd2, Wd4 and Wd5 to determine one or more candidate intentions Int2, Int3 and Int5. The pattern matching function 1400 may also determine confidence scores Cs2, Cs3 and Cs5 corresponding to the candidate intentions Int2, Int3 and Int5, respectively.

Further, referring back to FIG. 13A, in step S1370, an intention with the highest confidence score is determined from among the candidate intentions Int2, Int3 and Int5. For example, if the confidence score Cs3 of the intention int3 is greater than any of the confidence scores Cs2 and Cs5 of the intentions Int2 and Int5, the intention int3 can be determined as a matching intention of the user.

Next, referring to FIG. 13B, one or more entities associated with the determined intention are selected from memory (e.g., database). In addition, a function corresponding to the determined at least one entity is called to provide an output parameter. A response including the output parameter is built and output, using the intention API, the built response to the microservice platform or other service modules in communication with the microservice platform using another one or more APIs.

Example relationships of intentions with respective entities and contexts are depicted in FIG. 14B.

Referring to FIG. 14B, the entities Ent1, Ent3 and Ent4 and the context Ct1 are selected in response to determination of the intention Int3 as a matching intention.

In steps S1390 and S1395, if a certain entity and/or context is determined in step S1380, database(s), function(s) and/or API(s) in association with the determined entity and/or context are called, so the database(s), function(s) and/or API(s) can output data or parameters required by the determined entity, context and/or intention to one or more of the microservice service modules, form factors, and/or any other external computing devices that may have demanded the data or parameters.

By way of example only, if the keywords utterances of a user query are given such as 'What', 'is', 'my', 'account' and 'balance', the intention to be determined may be 'Check account balance', the entities to be selected for the intention may be 'date check', 'charge category check', 'transaction business name check', 'amount check', 'financial institution name check', etc. In response to the date check (e.g., Date check=True) being selected as an entity, the intention analysis module 60 may call a database, a function and/or an API to obtain data corresponding to output parameters such as 'from data', 'to data', 'matched data keyword', etc.

Further, in response to the charge category check (e.g., Charge category check=True) being determined as an entity, the intention analysis module 60 may call a database, a function and/or an API to obtain data corresponding to output parameters such as 'category_levels_to_check', 'category_level0', 'category_level1', 'category_level2', 'matched_category_keyword', etc.

Further, in response to the transaction business name check (e.g., Transaction business name=True) being determined as an entity, the intention analysis module 60 may call a database, a function and/or an API to obtain data corresponding to output parameters such as 'txn_biz_name', etc.

Further, in response to the transaction business name check (e.g., Transaction business name check=True) being determined as an entity, the intention analysis module 60 may call a database, a function and/or an API to obtain data corresponding to output parameters such as 'txn_biz_name', etc.

Further, in response to the amount check (e.g., Amount check=True) being selected as an entity, the intention analysis module 60 may call a database, a function and/or an API to obtain data corresponding to output parameters such as 'amount', etc.

Further, in response to the institution name (e.g., Institution name check=True) being selected as an entity, the intention analysis module 60 may call a database, a function and/or an API to obtain data corresponding to output parameters such as 'institution_name', etc. The multiple group of data corresponding to the output parameters can be consolidated into a payload (or a response) to be output to the aforementioned service modules, the form factors, and/or any other external computing devices.

Figure 14C:
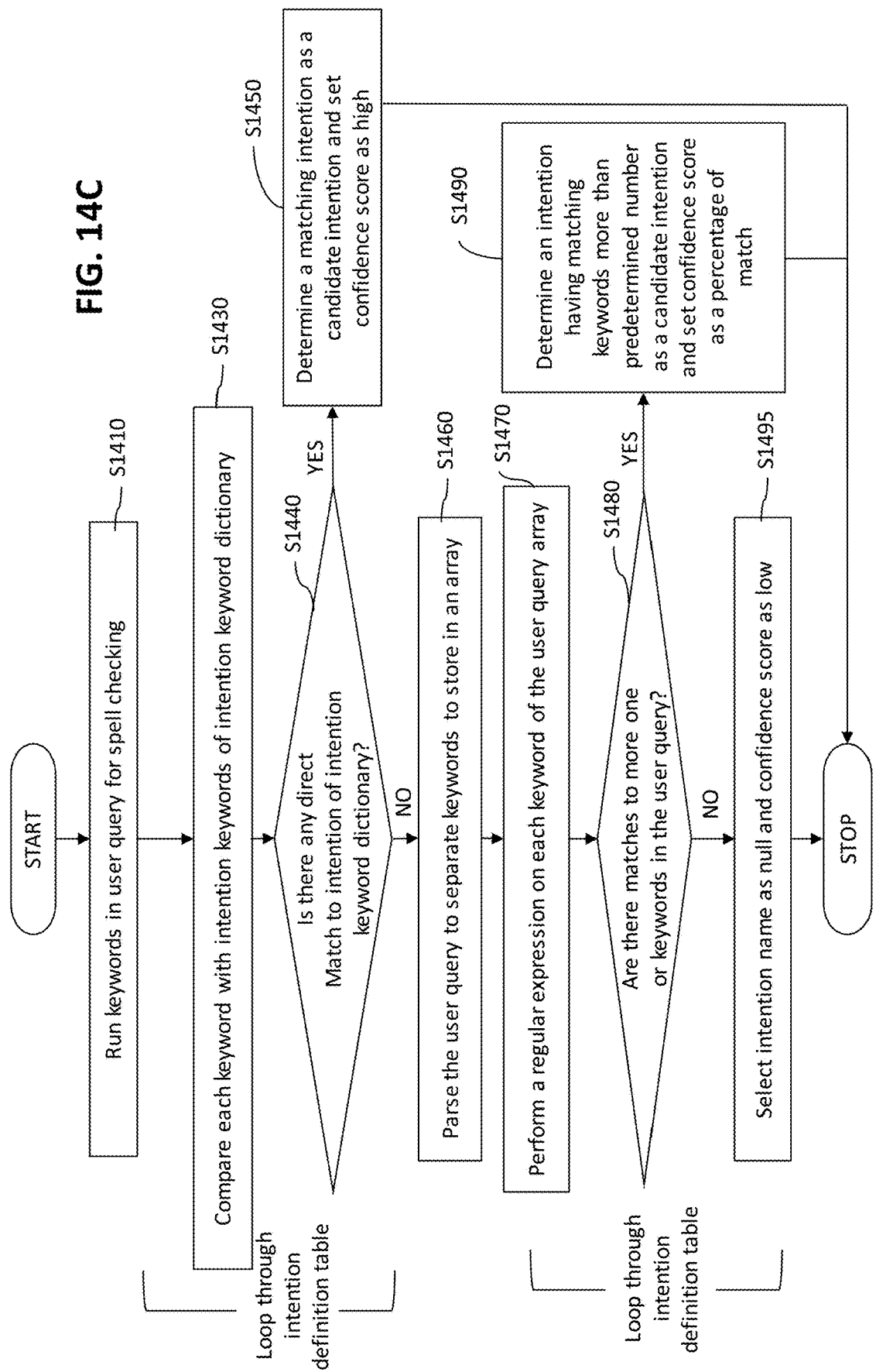
FIG. 14C depicts a flow chart for an intention analysis pattern matching function according to an embodiment of the present disclosure.

Referring to FIG. 14C illustrating a flow chart for the intention analysis pattern matching function 1400, keywords in the user query are run for spell check through, e.g., a third party spell check API to ensure the words are spelled corrected (S1410).

In addition, each keyword of the user query is compared with a respective one of the intention keywords of the intention keyword dictionary (see e.g., FIG. 3) (S1430) and determine whether there are any direct pattern matching therebetween (S1440). For example, step S1430 can be performed by using a regexp_matches_hash function (POSIX). If a direct match is found between a certain keyword of the user query and an intention keyword of the intention keyword dictionary (YES), an intention (e.g., 310 of FIG. 3) that is mapping to the intention keyword of the intention keyword dictionary is determined as a candidate intention and a confidence score to the determined candidate intention is set as 'high' (e.g., 90% out of 100%) (S1450). If no direct match is found between any of keywords of the user query and an intention keyword of the intention keyword dictionary (NO), the keywords of the user query are separate and stored in an array (S1460).

Next, in step S1470, a regular expression is performed on the user query array to see if there is a regular expression match (e.g., regexp_match) to keywords of the user query. If a regular expression match is found to one or more keywords in the user query (YES), a certain intention having matching keywords more than a predetermined number is determined as a candidate intention and a confidence score to the determined candidate intention is set as a percentage of match (S1490); in some examples, an intention having most matching keywords can be determined as a candidate intention and a confidence score to the determined candidate intention can be set as a percentage of match. If no regular expression match is found to any keyword in the user query (NO), the intention name is selected as 'null' and a confidence score is set as low (S1495). For example, no candidate intention may be determined in step S1495.

In addition, the card recommendation module 80 leverages the algorithm that determines the best credit or debit card to use prior to making a purchase. This is conducted by considering various factors in order to come up with a series of card recommendations starting from the highest confidence score. The card recommendations will be provided for the user's connected cards.

The card recommendation module 80 can be used by financial institutions, and payment companies as-a-service to obtain the purchasing scenario of the user and based on the various parameters, the card recommendation module 80 can provide recommendations using a particular card to enhance the decision-making process for the user and maximize cash back and reward without adversely impacting the financial wellness of the user. This card recommendation module 80 can also be applied for development of new applications or enhancing existing applications to enrich end client experience.

Examples of factors used in the algorithm for recommending the best card are as follows:

(a) goal credit score improve (i.e., goal_credit_score_improve_flag): This flag indicates if the user's preference is to improve his/her credit score when getting card recommendations. If this flag is detected, for example, weightage for credit cards will be set to a lower level to give preference to debit cards when the overall credit utilization is higher than a threshold limit;

(b) goal maximize reward (i.e., goal_maximize_rewards_flag): This flag indicates if the user's preference is to maximize the rewards for the money that the user spends. If this flag is detected, for example, preference is given to credit cards by giving higher weightage to the credit cards than the debit cards, so that the user gets the reward in terms of points of cash back;

(c) card type (i.e., card_type): The type of the card (debit or credit) will have an influence during the selection criteria. Typically, credit cards come with more cash back and incentives than debit cards which will have a bearing on generating the scoring for each card;

(d) purchasing category (i.e., purchasing_category): Globally, every transaction is categorized into a specific high-level category and this is what will determine how much reward will need to go back to the user. Hence, determining the purchasing category prior to making the purchase will help determine the total reward for the intended purchase;

(e) airline name (i.e., airline_name): In some cases, if the purchase is for an airline ticket, there will be a need to determine the airline_name, mainly because a few airlines issue their own credit cards in partnership with Credit Card Issuers. In such cases, preference and weightage need to be given to airline cards (e.g., if the user has the connected card for the airline). For example, if the user has a credit card issued by Airline 'X' and is looking for credit card recommendations for booking flight tickets on Airline 'X', the cash back or reward will be higher when compared to other credit cards, so necessary weightage must be given to ensure this is taken into consideration;

(f) hotel name (i.e., hotel_name): In some cases, if the purchase is for a hotel accommodation, there will be a need to determine the hotel name, mainly because hotels issue their own credit cards in partnership with Credit Card Issuers. In such cases, preference and weightage need to be given to credit cards if the user has the connected card for the hotel. For example, if the user has a credit card issued by Hotel 'Y' and is looking for credit card recommendations for booking accommodation on Hotel 'Y', the cash back or reward will be higher when compared to other credit cards, so necessary weightage must be given to ensure this is taken into consideration;

(g) business name (i.e., business_name): In some cases, credit cards rewards are based on specific businesses, so it is important to determine the business name;

(h) current location (i.e., current_location): In some cases, credit card rewards are based on geographic locations or geofences, so this need to be determined and accounted as part of the algorithm; and (i) card master data store (i.e., card_master_data_store): This data store includes an array of all credit cards and debit cards issued by credit card issuer along with the rewards and incentives for each purchasing category. This data store will be used by the algorithm.

In addition, weightages need to be defined that will be taken into account as part of the recommendation score. Examples of the weightages that will be used in the algorithm are as follows:

(a) reward point multiplier (i.e., reward_points_multiplier_wt): Each purchasing category comes with its reward multiplier and a weightage needs to be defined for this. For example, if the user's transaction is related to a travel (e.g., if a travel purchasing category is determined for the purchasing_category factor, the reward for every dollar spent could be 6 points (e.g., 6×), to calculate the score, the weightage;

(b) credit utilization (i.e., credit_utilization_wt): Weightage needs to be assigned for the overall credit utilization of the client;

(c) credit score (i.e., credit_score_wt): Weightage need to be assigned for the credit score/credit worthiness of the client;

(d) travel insurance available (i.e., travel_insurance_available_wt): Weightage need to be assigned if the card provides travel insurance; and (e) priority boarding available (i.e., priority_boarding_available_wt): Weightage need to be assigned if the card provides priority boarding.

Figure 15:
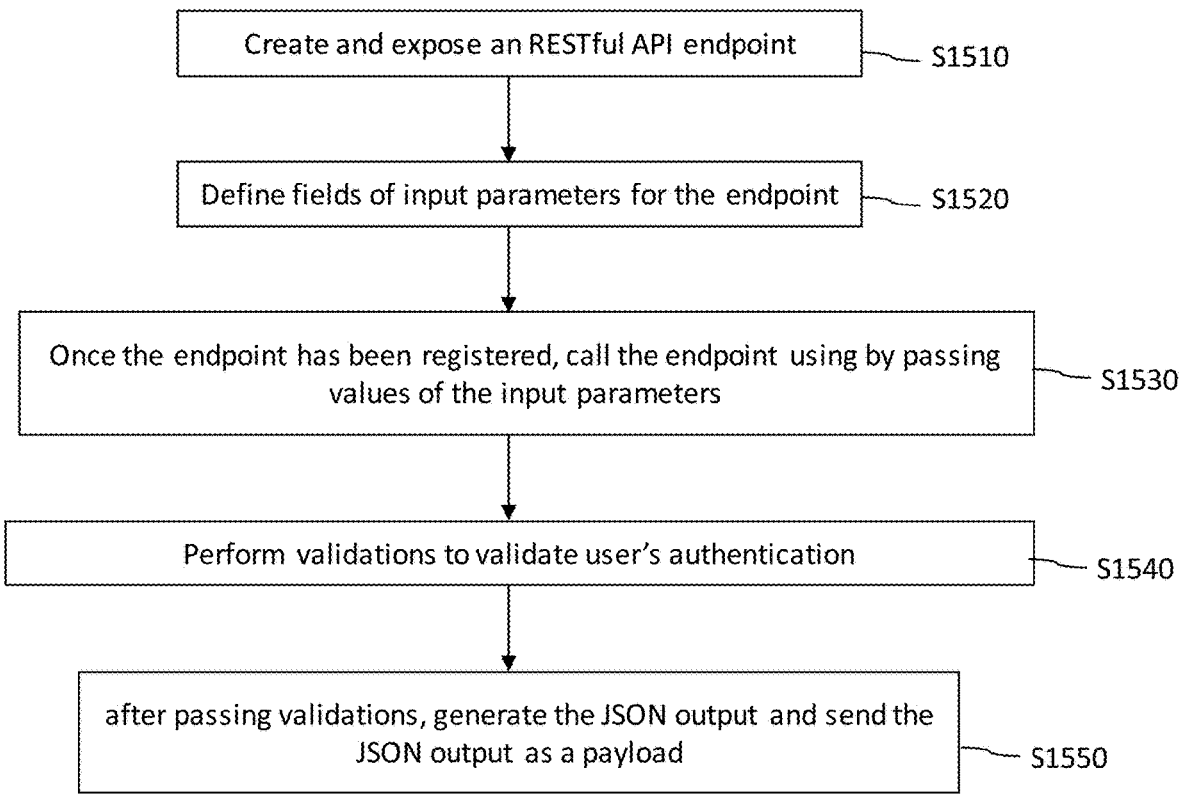
FIG. 15 depicts a flow chart of a method for calling a card recommendation module by invoking a card recommendation API endpoint during the development phase of the client support application.

Described below is a mechanism as to how the client support application (in use) built by financial institutions can access the card recommendation module 80 via an API endpoint (e.g., 918 of FIG. 1). In a development phase, the application developer can access the API endpoint directly through a RESTful API call as opposed to logging in to the financial institutions dashboard portal. FIG. 15 depicts a flow chart of a method for calling the card recommendation module 80 by invoking the card recommendation API endpoint during the development phase of the client support application.

In step S1510, a RESTful API endpoint pertaining to the card recommendation module 80 is created on a web server implemented in the microservice platform 10 and/or an external web server in a manner that will help the developer to call the card recommendation service, and the created API endpoint is adapted to be exposed to e.g., the client support application.

In step S1520, fields of input parameters for the endpoint are defined. The input parameters fields include, but are not limited to: client ID, secret, purchasing category, user-connected cards array, purchase amount, etc.

In step S1530, once the endpoint has been registered, the card recommendation endpoint is called using a RESTful client (e.g., the client support application or other microservice modules) by passing values (or contents) of the input parameters to the card recommendation API of the microservice platform. The card recommendation API of the microservice platform 10 calls the card recommendation module 80 based on the input parameters.

In step S1540, the card recommendation module 80 performs validations to validate the user's authentication.

In step S1550, after passing validations, the card recommendation module 80 generates a JSON output parameter and send the JSON output parameters as a payload (or response) to the microservice platform 10, other service modules (e.g., 20 to 70 of FIG. 1), and the users (e.g., developer or user to the built client support application) via the API endpoint (e.g., 918).

Figure 16:
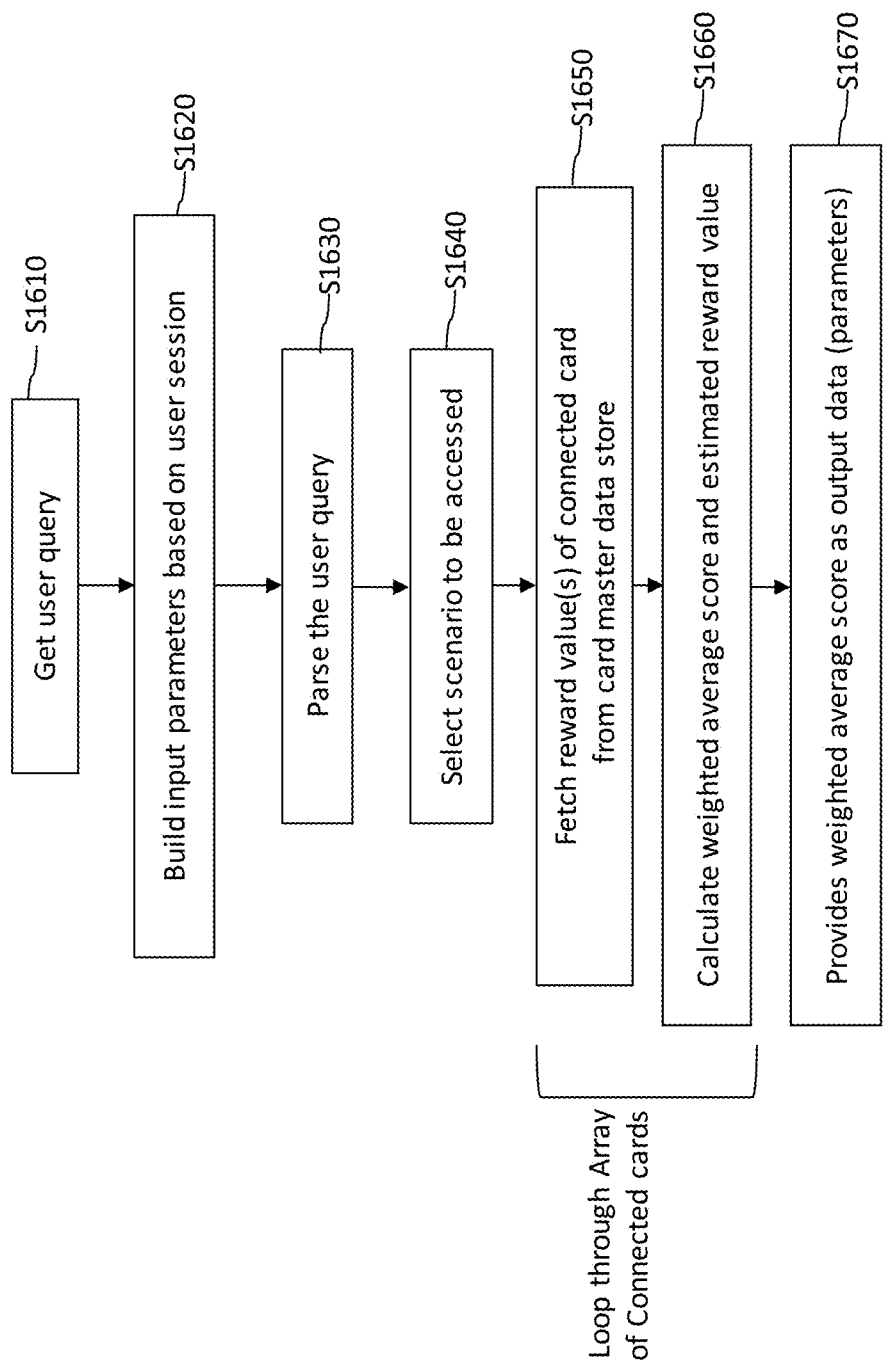
FIG. 16 depicts a flow chart of a method of how the card recommendation module works in communication with the client support application to get a user query and conduct a card recommendation to the user query according to an embodiment of the present disclosure.

FIG. 16 depicts a flow chart of a method of how the card recommendation module 80 works in communication with the client support application to get a user query and conduct a card recommendation to the user query according to an embodiment of the present disclosure. For example, the method of FIG. 16 is related to how the card recommendation module 80 is called by the client support application which has been built.

Referring now to FIG. 16, the method commences with getting a user query provided via the form factors at client ends (S1610).

Further, values of the input parameters are provided based on user sessions (S1620). The input parameters include, but are not limited to: client ID, secret, user query, purchasing category, user-connected cards array, purchase amount, etc. The client ID refers to an ID of the cloud platform registered user (e.g., developer). The secret refers to the cloud system secret for the cloud platform registered user. The query text refers to a user query that will be used for the card recommendation. The purchasing category refers to a specific purchasing category for the intended purchase. Examples of the purchasing category include 'travel', 'shopping', 'food', 'restaurant', 'café ', etc. The user-connected cards array refers to information on cards that the client has. If the user has the information on the cards, the same can be sent as an array. This will be a basis for determining the card recommendation score for each card. The purchase amount referring to a specific targeted purchasing amount for the purchase. This amount (if sent) will be used to calculate the potential cash back value for the overall purchase. The card recommendation API is called using a secure RESTful endpoint (e.g., https:mybank.fintel.ai/get_card_recommendations). In step S1630, the user's query is parsed.

Further, a plurality of scenarios can programmatically be defined as part of the card recommendation module 80. One of the scenarios to be accessed is selected based on the input parameters and the status of flags (e.g., goal_credit_score_improve_flag and goal_maximize_reward_flag) with regard to the user's preference (or goal) in using the cards (S1640). For example, the client's preference is preset or updated according to the client's input.

By way of example only, if both the goal_credit_score_improve_flag and the goal_maximize_reward_flag are turned on, a scenario (i.e., scenario 1 of FIG. 17B) taking into account both goals: improving credit score and maximizing the rewards is selected to be accessed (e.g., IF (b_goal_credit_score_improve_flag IS TRUE) AND (b_goal_maximize_rewards_flag IS TRUE) THEN s_scenario=one_or_more_card_attached_linked_accounts_both_goals).

If the goal_credit_score_improve_flag is turned on and the goal_maximize_reward_flag is turned off, a scenario (i.e., scenario 2 of FIG. 17B) only taking into account the goal of improving credit score is selected to be accessed (e.g., IF (b_goal_credit_score_improve_flag IS TRUE) AND (b_goal_maximize_rewards_flag IS FALSE) THEN s_scenario='one_or_more_card_attached_linked_improve_credit_score_wt').

If the goal_credit_score_improve_flag is turned off and the goal_maximize_reward_flag is turned on, a scenario (i.e., scenario 3 of FIG. 17B) only taking into account the goal of maximizing the rewards is selected to be accessed (e.g., IF (b_goal_credit_score_improve_flag IS FALSE) AND (b_goal_maximize_rewards_flag IS TRUE) THEN s_scenario='one_or_more_card_attached_linked_accounts_maximize_benefits').

In some cases, a default scenario can be set, e.g., if none of the flags is turned on. The default scenario may take into account the above two goals of improving credit score and maximizing the rewards.

In addition, an array of the connected cards is looped through according to a selected scenario from the step S1640. The array of the connected cards is stored as part of the above-mentioned card master data store in memory (not shown) or other external storage (not shown) connected to the card recommendation module 80.

The looping through of the connected cards includes: for each connected card of the array, fetching reward value(s) defined for various categories (e.g., 'gas', 'grocery', 'supermarkets', 'movies', 'restaurants', 'airlines', 'hotel', 'boarding', etc.) from e.g., card master data store (S1650) and calculating a weighted average value (or a card recommendation score) and/or an estimated reward value for the amount specified by the client (S1660). For example, the estimated reward may be obtained by multiplying an amount of money spent to a corresponding reward point and be used for calculating the weighted average value. In the present disclosure, the weighted average value is understood to mean "card recommendation score". Examples of the array of connected cards including information on the reward values for various categories are depicted in FIG. 17A.

In step S1670, the weighted average value (or the card recommendation score) is provided as output data (parameters) optionally along with an account name and/or a rank.

In an optional step, the weighted average value for the respective candidate cards are compared with each other and a card with the highest score is determined as a recommended card and provided as the JSON output.

Figure 17B:
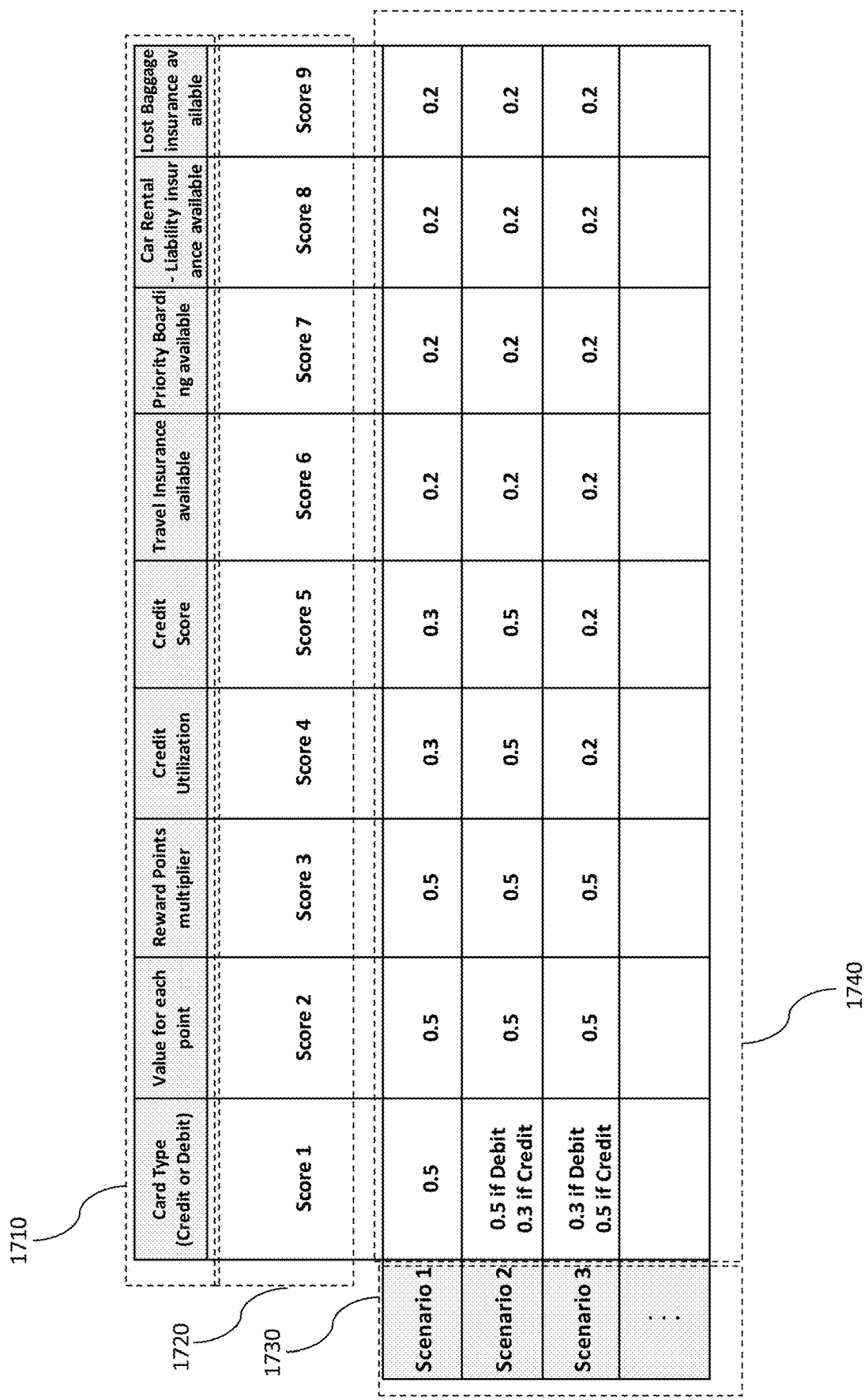
FIG. 17B is an example view illustrating how weightages and factors are changed according to a selected scenario according to an embodiment of the present disclosure.

FIG. 17B is an example view illustrating how weightages and factors are changed according to a selected scenario according to an embodiment of the present disclosure.

Referring now to FIG. 17B, the above-mentioned three scenarios 1 to 3 are considered as example scenarios (e.g., see 1730), and example factors (e.g., see 1710) to be considered for calculating a weighted average value are enumerated in the first row of FIG. 17B.

For example, the implementing bank or financial institution may consume the card recommendation algorithm to provide generic card recommendations to their end users (as an effort to upsell new credit cards), in which case, the weightage for scenario 'user with no cards attached at all' will be used. As another scenario, the bank may give a provision to users to take into account the connected credit cards to provide more accurate and personalized recommendations, and if the user has selected a goal to maximize cash back, the weightages for scenario 'user with one or more cards attached with partial or all accounts linked with 'Maximize Cashback/reward benefits' will be used.

The example scenarios 1 to 3 are scenarios 'user with one or more cards attached and at least one of the cards is linked to accounts(s)'. More particularly, the scenario 1 represents a scenario where both goals (e.g., the goal for improving credit score and the goal for maximizing reward) are selected by the user, the user holds one or more cards attached, and at least one of the cards is linked to accounts(s). Further, the scenario 2 represents a scenario where the goal for improving credit score is selected by the user, the user holds one or more cards attached, and at least one of the cards is linked to accounts(s), and the scenario 3 represents a scenario where the goal for maximizing reward is selected by the user, the user holds one or more cards attached, and at least one of the cards is linked to accounts(s).

Although not shown in FIG. 17B, it will be appreciated that other scenarios such as 'user with no cards attached at all', 'user with one or more cards attached (not linked to any accounts) with both goals selected', 'user with one or more cards attached (not linked to any accounts) with the goal for improving credit score selected', and 'user with one or more cards attached (not linked to any accounts) with the goal for maximizing reward selected' can further be conceived.

Referring further to FIG. 17B, corresponding scores (e.g., see 1720) are set to each of the factors 1710, and weightages for each combination of a scenario and a factor are set as shown with reference numeral 1740. It is noted that the numbers or values shown in FIG. 17B are only examples given for the sake of description, embodiments of the present disclosure are not limited thereto.

For example, if a card at interest is a debit card, the score 1 will be '1' as default, the weightages will vary depending on the selected scenarios 1 to 3; for example, 0.5, 0.5 and 0.3 respectively for the scenarios 1 to 3. Similarly, if a card at interest is a credit card, the score 1 will be '1' as default, the weightages will be 0.5, 0.3 and 0.5 respectively for the scenarios 1 to 3.

The score (e.g., score 2) of value for each point is set using the value for each point as is, and the weightages will be 0.5, 0.5 and 0.5 respectively for the scenarios 1 to 3.

The score (e.g., score 3) of reward points multiplier is set using the reward point of the card as is, and the weightages will be 0.5, 0.5 and 0.5 respectively for the scenarios 1 to 3.

In addition, the score (e.g., score 4) of the credit utilization is set using the score chart for this, and the weightages will be 0.3, 0.5 and 0.2 respectively for the scenarios 1 to 3. For example, in case of a credit card, if the credit usage is in a range of 0% to 20%, the score will be '1' representing 'Excellent'; if the credit usage is in a range of 21% to 40%, the score will be '0.8' representing 'Very Good'; if the credit usage is in a range of 41% to 60%, the score will be '0.6' representing 'Good'; if the credit usage is in a range of 61% to 80%, the score will be '0.4' representing 'Fair'; and if the credit usage is in a range of 81% to 100%, the score will be '0.2' representing 'Bad'. In case of no accounts linked, the score will be 0 representing 'score not applicable'. In case of a debit card, the score will be 0.5.

In addition, the score (e.g., score 5) of the credit score is set using the score chart for this, and the weightages will be 0.3, 0.5 and 0.2 respectively for the scenarios 1 to 3. For example, if the credit score corresponds to 'excellent', the score will be '1' representing 'Excellent'; if credit score corresponds to 'very good', the score will be '0.8' representing 'Very Good'; if the credit score corresponds to 'good', the score will be '0.6' representing 'Good'; if credit score corresponds to 'fair', the score will be '0.4' representing 'Fair'; and if credit score corresponds to 'bad', the score will be '0.2' representing 'Bad'. In case of no credit score entered, the score will be 0 representing 'score not applicable'.

In addition, the score (e.g., score 6) of the travel insurance available is set as '1' representing 'Excellent' if the travel insurance is available with the card at interest and set as '0 (or null)' representing 'score not applicable' if the travel insurance is not available. The weightages will be 0.2, 0.2 and 0.2 respectively for the scenarios 1 to 3.

In addition, the score (e.g., score 7) of the priority boarding available is set as '1' representing 'Excellent' if the priority boarding is available with the card at interest and set as '0 (or null)' representing 'score not applicable' if the priority boarding is not available. The weightages will be 0.2, 0.2 and 0.2 respectively for the scenarios 1 to 3.

In addition, the score (e.g., score 8) of the car rental liability insurance available is set as '1' representing 'Excellent' if the car rental liability insurance is available with the card at interest and set as '0 (or null)' representing 'score not applicable' if the car rental liability insurance is not available. The weightages will be 0.2, 0.2 and 0.2 respectively for the scenarios 1 to 3.

In addition, the score (e.g., score 9) of the lost baggage insurance available is set as '1' representing 'Excellent' if the lost baggage insurance is available with the card at interest and set as '0 (or null)' representing 'score not applicable' if the lost baggage insurance is not available. The weightages will be 0.2, 0.2 and 0.2 respectively for the scenarios 1 to 3.

In order to calculate the weighted average value (or the card recommendation score) of a certain card for a particular scenario selected by a user, a weightage for each factor is selected (according to the selected scenario) from the table of FIG. 17B. The initial value of the weighted average value is set to be '0'. Each weighted average value for a certain factor can be obtained by multiplying a score (e.g., 1720) by a weight (e.g., 1740). The total weighted average value can be obtained by aggregating the weighted average values calculated for the respective factors.

FIGS. 18A to 18C depict an example JSON output format of the card recommendation module 80 according to an embodiment of the present disclosure.

Referring to FIG. 18A, the JSON output includes a header portion 1810 and a card recommendation data portion 1820. The recommendation data portion 1820 further includes respective output parameters 1821 and 1822 for the candidate (or connected) cards (e.g., card 1 and card 2 of FIG. 17A). Examples 1830 and 1840 of the output parameters for the card 1 and card 2 are depicted in FIGS. 18B and 18C, respectively.

By way of example only, referring back to FIG. 18A, in case the card 1 is considered for purchasing gas of 100 dollars amount (e.g., grocery category), the reward value will be estimated as 5 (e.g., 5=amount (100 dollars)*gas reward (5%)). The weighted average value is updated by adding a result of multiplying reward points multiplier (i.e., reward_points_multiplier_wt) with the gas reward to a previous weighted average value. For example, IF reward_category_name='gas_reward' THEN weighted_average_value_for_account:=weighted_average_value_for_account+reward_points_multiplier_wt*gas_reward; estimated_reward_value:=amount*gas_reward.

The card recommendation module 80 may be a hardware or software component that is configured, designed, and/or programmed to perform the above-mentioned tasks and actions.

In addition, the conversational intelligence module (or bot) 30 is developed as a conversational virtual assistant (or bot) using other microservices modules (e.g., intention analysis module 60, sentiment analysis module 50, ML module 40, etc.). The conversational virtual assistant works as an engaging platform for end users to chat with the assistance using their natural language. The conversational assistant can be developed for various use cases such as retail banking, wealth management, customer service, asset management, knowledge management, customer onboarding, etc. For example, there are two ways for implementing the conversational features required by financial institutions.

First, the conversational features can be implementing by developing brand new bots. The brand new bots can be created using the presently-disclosed cloud system to cater to various use cases where the bot can fulfil the need of a specific use case.

By way of example only, financial institutions developing the service may want to create a retail banking conversational assistant that will understand the user's question, build responses on the fly, and render appropriate responses. In this case, some of the very common questions may include questions such as: 'what is my available balance', 'what is my outstanding balance on my credit cards', 'how much did in spend on travel last month', etc. Some of the more complex questions may include questions such as: 'why have I been paying so much towards interest in the last few months', 'what is a good credit card to use for booking flight tickets', 'given my current financial situation would I be able to afford a new phone for $1000?', 'how will my financial position be in the future?', etc. All of these questions can be built (or provided) using the algorithm (to be described later) to create a brand new conversation user experience for the end user base.

Second, the conversational features can be implemented by enhancing existing bots. For example, financial institutions can enhance their existing bots by leveraging specific some of the microservice modules and/or the microservice platform 10 to make the user experience engaging, intelligent and empathetic.

By way of example only, if a financial institution already has a virtual assistant to understand user questions in natural language, the financial institution may choose to implement the sentiment analysis module 50 to understand the user's sentiment and provide more contextual and empathetic responses based on the determined sentiment. For example, in its current state the existing bank bot may respond to a question 'why am I paying so much towards interest in the last few months ☹ ' in a non-empathetic manner. However, the conversational intelligence bot can be developed in a manner where the user query is sent to the sentiment analysis module 50 through an appropriate API. If the responses from the sentiment analysis module 50 indicate that the user is unhappy or dissatisfied with the high interest rates, the conversational intelligence bot can provide responses to be more empathetic to the user based on the determined sentiment(s), and potentially even upsell or cross-sell services to improve the overall psyche of the user.

Here is a high level overview of the actions that go into building a conversational intelligence bot, the flow for which is given below in more detail.

Listed below are some of factors that influence the building of the conversational intelligence bot. The factors may need to be determined prior to the actual development of the conversational intelligence bot:

(1) Use case: the first and foremost factor is identifying the exact use case for which the conversational intelligence bot needs to be built for. There are no hard and fast rules for a specific set of use cases and this really is up to the imagination of the financial institutions to develop a bot based on the requirement. As indicated earlier, the use cases can range from a simple conversational bot for retail banking to a more complex use case such as a regulatory compliance check bot (which will indicate if the responses of the customer support agents conform to regulations).

(2) End users: determining the end user of the conversational intelligence bot is a critical aspect of the overall conversational experience. The end user of the bot could range from external customers to specific internal teams. Also, depending on the end user, the consumption or the form factor can be determined. For example, if the bot is for external customers, then the bot needs to work on a mobile application and on the financial institution's web portal. However, if the bot is for internal teams, it may be needed to be available only on a web browser.

(3) Language: understanding user's language is an important factor while building the bot. If the need is to support multiple languages, this means that the underlying intentions need to be trained with keyword utterances for the languages in question.

(4) Form factor: the consumption of the bot on potential form factors need to be determined prior to developing the conversational bot. As mentioned above, in some use cases, the bot may be needed only on mobile smartphones, in some cases it may be needed only on voice assistants, and in some cases, it may be needed on all form factors such as smart TVs, connected cars, smartphones and web portals.

(5) Defining Intentions: once the use case has been identified, all the potential intentions of the user is defined using, e.g., a cloud platform dashboard (e.g., see FIG. 3). For each intention, it will also be critical to establish the entities and contexts to check as described regarding the intention analysis module 60. For example, for some intentions, there may be a need to check for timelines, account types, bank name, shopping category, etc.

(6) Sentiment analysis: when building conversational intelligence bot, it is important to determine if the user's sentiment need to be assessed to facilitate a more engaging and empathetic conversation.

Figure 20A:
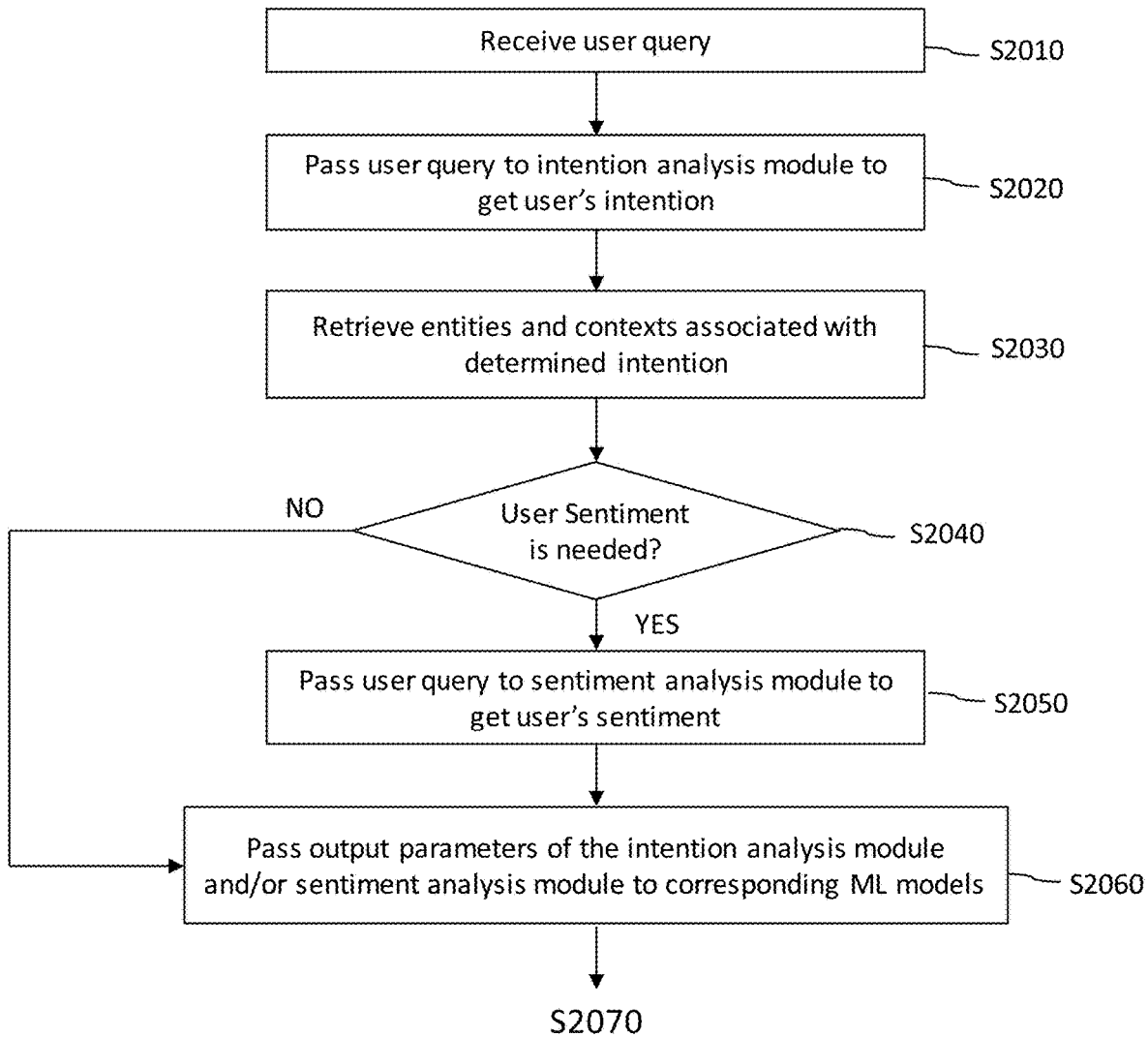
FIGS. 20A and 20B depict a flow chart of a method of how a conversational intelligence bot works in communication with the client support application and other service modules according to an embodiment of the present disclosure.
Figure 20B:
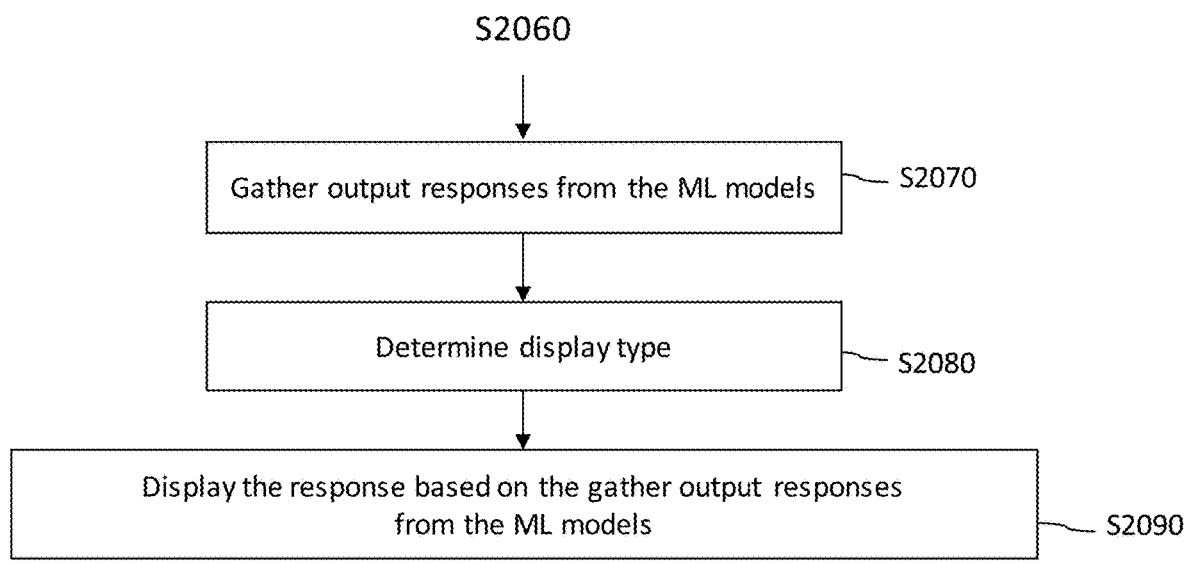

FIGS. 20A and 20B depicts a flow chart of a method of how the conversational intelligence bot 30 works in communication with the client support application and other service modules according to an embodiment of the present disclosure.

Figure 19:
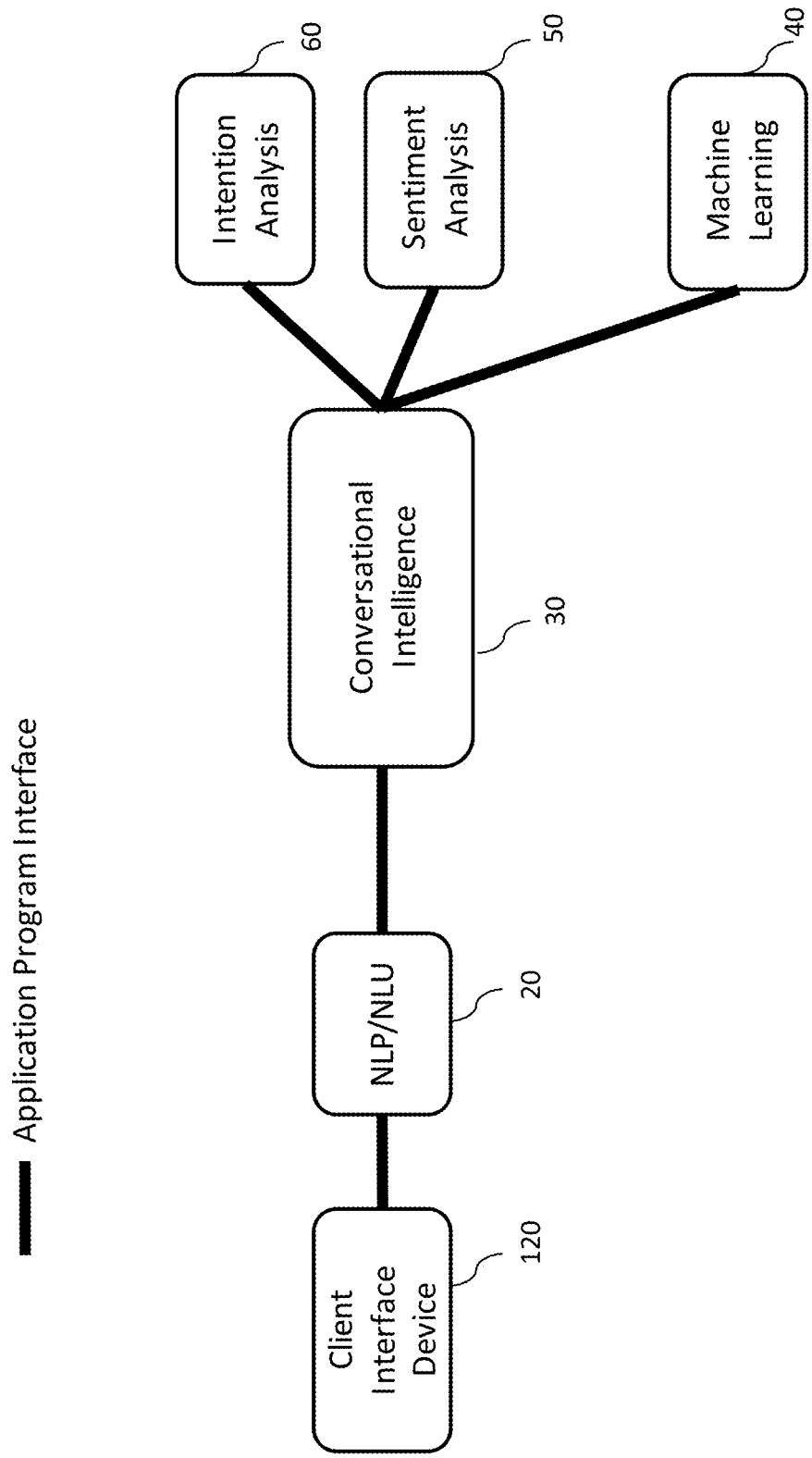
FIG. 19 depicts an application program interface according to an embodiment of the present disclosure.

Referring to FIGS. 20A and 20B, the method commences with getting a user query provided via the form factors at client ends (S2010). The user query can be formed in a natural language text or voice. In some aspects, referring to FIG. 19, the NLP/NLU module 20 may be used between the client interface device 120 (e.g., form factor) and the conversational intelligence bot 30 to help convert a voice (in any) to a text and/or pass the query to other service modules (e.g., intention analysis module 60, sentiment analysis module 50, etc.). In some aspects, the microservice platform 10 can be leveraged to provide connections between the relevant service modules via corresponding APIs; for example, the conversational intelligence bot receives a call from the microservice platform through APIs along with the user query.

In step S2020, if needed, the user query is passed to the intention analysis module 60 through an intention analysis API to determine the user's intention. The user's intention output through the intention analysis module 60 will give information as to what the user is looking to gather from an information perspective.

In step S2030, the entities and/or contexts associated with the determined intention are retrieved. For example, the intention may need to take into account potential date and time considerations to derive parameters such as e.g., "@from_date", "@to_date", etc. Further, all the entities and/or contexts are checked and all the corresponding values (e.g., output parameters) are gathered.

In step S2040, it is determined whether the user sentiment is needed to conversate with the user.

If the user sentiment is needed in S2040 (YES), the user query is also passed to the sentiment analysis module 50 through the sentiment analysis API to determine the user's sentiment (S2050). The output parameters (e.g., JSON parameters) including the user's sentiment obtained through the sentiment analysis module 50 are gathered.

In step S2060, the gathered output parameters (e.g., user's intention, associated entities and contexts and/or user's sentiment) are passed to corresponding ML models of the ML module 40 to perform analytics on top of the data specific to the user. In most cases, a connection may need to be established to connect to a data store (not shown) to apply the analytical models on the data.

If the user sentiment is not needed in S2040 (NO), the method goes to S2060 without performing the step S2050.

In step S2070, the output responses from the ML models are gathered.

In steps S2080 and S2090, the display type for rendering information (e.g., associated with the output responses from the ML models) back to the user is determined and the response based on the gathered output responses from the ML models are displayed. For example, the display types that will be supported, but are not limited, include: messages, voice responses, text response, messages+transactions, pie charts, bar charts, tabular account displays, etc. Depending on the type of a form factor, the best display type can be selected. For example, if the form factor is a mobile smart phone, the display type can be a combination of display message, voice message and transactional information. However, if the form factor is an Amazon Alexa Skill set, the response can only be a voice message.

If the sentiment analysis has been done as a part of the step S2050, the responses back to the user can be altered based on the user's sentiment determined through the sentiment analysis module 50. For example, if the question is 'why am I paying so much towards interest ☹ ?', the output of the sentiment analysis module 50 will come back with a sentiment of 'unhappy'. In this case, the response to be displayed to the user's form factor will be, for example, 'We completely understand your concern, however, these are charges levied by the bank for late payment on the total outstanding amount. Would you like to be reminded for payment going forward?'. In this case, the conversational intelligence bot 30 understands that the user is unhappy and automatically changes the response (to be sent to the user) to provide a more contextual and a proactive message.

Described below is an example conversational intelligence bot built for retail banking. In this example, the users can connect to all their financial accounts and ask questions in their natural language to get a better understanding of their finances. The objective in this example is to build a mobile application that will incorporate with other cloud microservices to build the bot.

Figure 21:
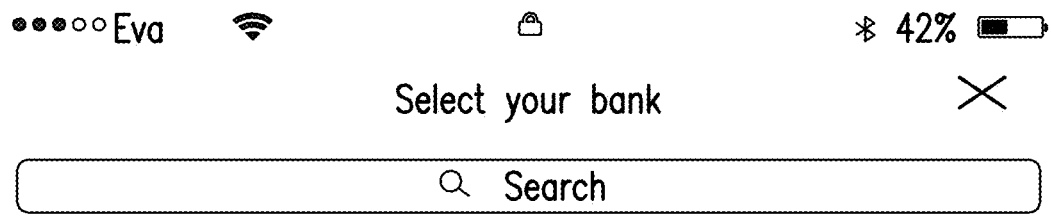
FIG. 21 depicts a diagram of an example user interface being built for users to connect their respective financial accounts according to an embodiment of the present disclosure.
Figure 22:
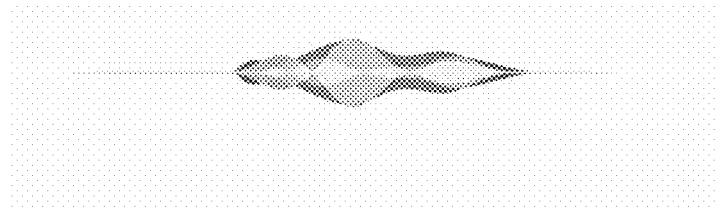
FIG. 22 depicts a diagram of an example user interface being built for users to ask questions in their natural language (using voice or text) according to an embodiment of the present disclosure.

First, a user interface for users to connect their respective financial accounts is built, as depicted by way of example in FIG. 21. In addition, a user interface for users to ask questions in their natural language (using voice or text) can be built, as depicted by way of example in FIG. 22.

Next, a user query is input by voice or text, as depicted by way of example in FIGS. 23A and 23B. The user query can be passed to the intention analysis module 60 and/or the sentiment analysis module 50 with appropriate parameters through respective corresponding APIs to JSON output responses. The example JSON output responses of the intention analysis module 60 and the sentiment analysis module 50 are respectively depicted in FIGS. 24A and 24B.

In addition, the parameter values of each JSON output response are passed to corresponding ML models of the ML module 40 through an appropriate API to build dynamic queries using the parameter values and execute the ML models based on the built dynamic queries on top of the bank data of the user. An example JSON output response of an ML model (e.g., ML spend analysis) is depicted in FIG. 25.

Figure 26:
FIG. 26 depicts an example response being displayed based on a display type according to an embodiment of the present disclosure.

Next, the response of the ML module 40 is displayed based on a certain display type. An example response being displayed based on a display type: a mix of messages and lists of transactions is depicted in FIG. 26.

In developing a conversational intelligence bot for a certain use case, if the bot is a brand new (e.g., if a bank already has a conversational intelligence bot for the use case), the natural language capture medium can be defined. Capturing the voice of the user can be accomplished depending on the form factor. Some operating systems provide a way to capture the voice and convert the same to text. For example, SiriKit SDK by Apple provides a way to capture the voice of the user and convert the same to text. Similarly, Google Speech is an SDK that can be used on Android devices to capture the user voice and convert the same to text. An alternate way to capture the user's natural language is using the text option where the user can type in their query.

However, if there is an existing conversational intelligence bot and the existing bot is being enhanced to provide more value-added services to the users of the bot, the above may not be considered and only algorithms such as making decisions whether to send a user query to other service modules (e.g., intention analysis module 60, sentiment analysis module 50, ML module 40), sending appropriate parameters, receiving output responses and leveraging the output responses in order to enhance the overall user experience. For example, if a financial institution already has a retail banking bot and would like to drive responses based on the sentiment, the bank can pass the user query to the sentiment analysis module 50 to get the sentiment, and model their responses based on the responses.

The conversational intelligence bot 30 may be a hardware or software component that is configured, designed, and/or programmed to perform the above-mentioned tasks and actions.

In addition, as a part of the cloud's on-demand analytics engine, the on-demand analytics module 70 is used for financial institutions to define or implement analytics that allows the customer support application to provide better analytics to their user base, thereby improving their decision-making capabilities. The financial institutions can use this module 70 as-a-service to define and deploy analytics (e.g., analytical models) as a plug- and-play service on top of their existing applications to enrich end customer experience.

For example, the on-demand analytics module 70 allows users to ask queries related to their banking environment and returns 'insights' instantly.

The on-demand analytics module 70 leverages dynamic analysis and reporting, based on data requested via voice or chat, to given near-instant responses. The module 70 also has the capability to provide predictively analytics and proactively update end users with continuous updates. The module 70 may be considered as analytics running in the background and being pushed through on a predetermined basis. For example, this type of data can provide a changing visualization of a user spend profile or account balance.

In one example, one or more analytical models may be implemented in the analytics module 70 and stored in memory (not shown). The analytical models can be provided as a plug-and-play service to the cloud platform user.

In one embodiment, there are predefined and out of the box analytical models available as part of the analytics module that can be leveraged by the customer. Examples of pre-defined analytical models are: (a) Account Snapshot, Spend by category, Spend forecast, Credit Usage Summary, Subscriptions, Interest Paid in Retail Banking; and (b) Portfolio Diversity, Portfolio Performance, Recent Transactions in Wealth Management.

In another embodiment, the customer can also define their own analytical model afresh based on their requirement. For example, if a customer is looking to implement just the analytics module into their existing electronic-wallet solution where they would like to provide spend and wallet insights (e.g., top 3 merchant spend, top 5 high value transactions, spend by location, etc.), they can create custom analytical models and invoke them to provide the analytics to their respective users.

Here is a high level overview of the actions that go into analytics as a service.

As a first step, financial institutions will register as a cloud platform user of the cloud microservice platform. This is a prerequisite for accessing the services related to the cloud microservice platform.

Once registered, the cloud platform user will define the analytics requirements that will need to be embedded on to their existing applications, so that appropriate analytical model(s) will be determined to be built based on the defined requirements.

Next, the input parameters needed for each analytical model and the output parameters for rendering the output of the analytical model are defined. Further, the display type for the output of the analytical model is defined. For example, the output of the analytical model can be rendered as pie chart, bar chart, summary tile, etc.

After the input parameters and the output parameters (and/or the display type) are defined for the analytics, the ML module 40 is called. For example, one or more ML models of the ML module 40 are defined for the analytics.

Next, a dynamic SQL query on the fly is generated by executing the ML models defined for the analytical model. The generated dynamic SQL query will be applied on the structured data if there is an active connection to database. The drill-down query may also be generated to provide the transactional details for the analytical output.

For example, the input parameters to the ML model can vary based on the custom model to be defined. For example, if the requirement is to build a comparison of portfolio performance between this month and the same month last year, the input parameters to the model would be the current date and time and user ID. The ML model that will be written will have the base query, and will include the parameters and generate a SQL query that will be executed on the database to generate a result that can be rendered in a specific display type (such as pie chart, bar chart, overlay chart, etc.)

Next, the JSON payload of the analytics module 70 is obtained from the executed SQL query. The JSON output payload can be built into the output parameter of the cloud microservice platform and publish the results in the desired display type.

The analytical model is packaged as a software development kit (SDK) for the various form factors and operating systems (e.g., iOS, Android, Windows) so that the SDK can be embedded into the existing software application. For example, the SDK can be generated specific to the client with configuration related to 'client ID' and 'secret' so that there is appropriate security validation.

Described below is an example of building an analytic (or analytical model) for a retail banking use case.

In the built analytics, the user will get an aggregated view of his/her financial accounts to get a better understanding of the spending patterns. The objective in this example is to build a set of analytics using the cloud microservices platform. The objective in this example is to build a mobile application that will incorporate with other cloud micro services to build the bot.

First, the requirements for the analytics to show to the user are defined. In this example, the analytics shown includes financial snapshot, aggregated insights on interest charges paid, spending by purchasing category, daily and monthly forecast based on average spending, subscriptions, etc.

Figures 27A, 27B, 27C:
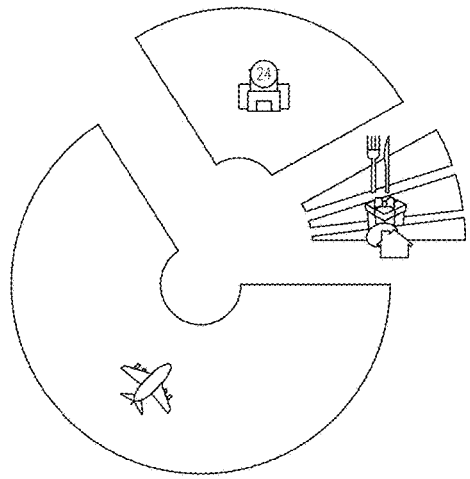

Next, a user interface and the associated display types for the analytics are defined. Examples of the display types that can be leveraged include card tile (for the financial snapshot, see FIG. 27A), aggregated value (for the aggregated insights on interest charges paid, see FIG. 27B), pie chart (for the spending by purchasing category, see FIG. 27C), forecast (for the daily and monthly forecast based on average spending, see FIG. 27D), aggregated listing (for the subscriptions, see FIG. 27E), etc.

In addition, the input and output parameters for each analytical model are defined. For example, the analytic for 'Spending by Purchasing category' will have the following as parameters:

(a) Input parameters: user ID, time window, client ID, secret, etc.; and (b) Output parameters (e.g., JSON payload); time window, purchase category, spend value, etc.

In the present disclosure, the term client ID represents the implementing Financial Institution (or Bank), and the user ID is a user of the Financial Institution for which the analytics will be generated. For example, if Bank ABC is implementing this module, the Bank ABC will be assigned a static client ID such as 'sj2KLdj3klfops92NjLLs' which will be constantly passed as a parameter to the models to ensure that the call is authentic. The user ID however would be a specific ID such as '379238' where the resulting analytics will be generated for that particular user who would be consuming the information.

In addition, ML model(s) for each of the analytics is defined. As described above, the ML module 40 can be invoked so that one or more appropriate ML models of the ML module 40 are defined for each analytic. The dynamic SQL queries that will need to be applied to the ML models are generated.

In addition, the generated SQL queries are applied on the retail transactions of the user to generate the JSON payload from the executed SQL query.

In addition, the analytical model can be packaged as an SDK and the SDK can be embedded into the existing applications.

The output will be displayed via the client support application of the client interface device 120.

The on-demand analytics module 70 may be a hardware or software component that is configured, designed, and/or programmed to perform the above-mentioned tasks and actions.

Figure 28:
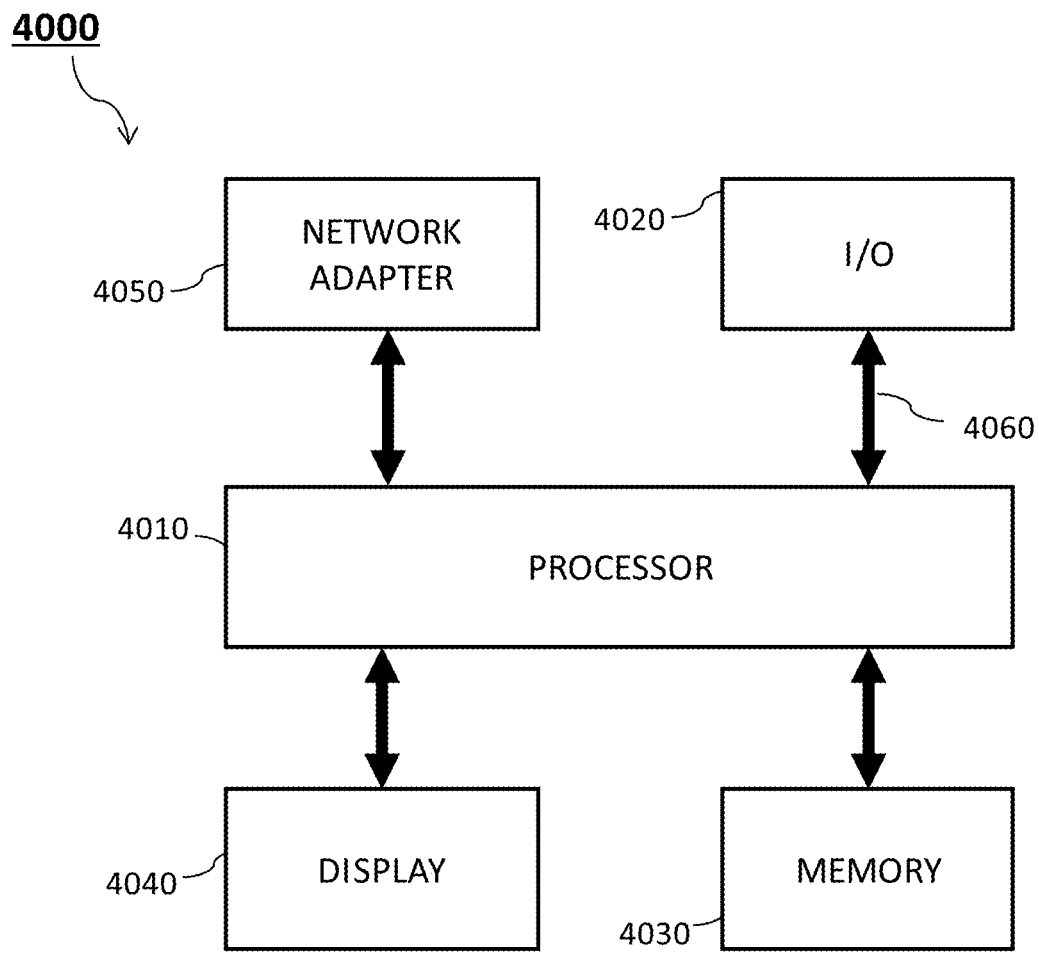
FIG. 28 is a block diagram of a computing system according to an illustrative embodiment of the present disclosure.

FIG. 28 is a block diagram of a computing system 4000 according to an illustrative embodiment of the present disclosure.

Referring to FIG. 28, the computing system 4000 may be used as a platform for performing: the functions, tasks, or operations described hereinabove with respect to the cloud microservice platform 10, the service modules 20 to 80 of FIG. 1; and the methods performed by the microservice platform 10, the service modules 20 to 80.

Referring to FIG. 28, the computing system 4000 may include a processor 4010, I/O devices 4020, a memory system 4030, a display device 4040, and/or a network adaptor 4050.

The processor 4010 may drive the I/O devices 4020, the memory system 4030, the display device 4040, and/or the network adaptor 4050 through a bus 4060.

The computing system 4000 may include a program module for performing: the functions, tasks, or operations described hereinabove with respect to the cloud microservice platform 10, the service modules 20 to 80 of FIG. 1; and the methods performed by the microservice platform 10, the service modules 20 to 80. For example, the program module may include routines, programs, objects, components, logic, data structures, or the like, for performing particular tasks or implement particular abstract data types. The processor (e.g., 4010) of the computing system 4000 may execute instructions written in the program module to perform: the functions, tasks, or operations described hereinabove with respect to the cloud microservice platform 10, the service modules 20 to 80 of FIG. 1; and the methods performed by the microservice platform 10, the service modules 20 to 80. The program module may be programmed into the integrated circuits of the processor (e.g., 4010). In an illustrative embodiment, the program module may be stored in the memory system (e.g., 4030) or in a remote computer system storage media.

The computing system 4000 may include a variety of computing system readable media. Such media may be any available media that is accessible by the computer system (e.g., 4000), and it may include both volatile and non-volatile media, removable and non-removable media.

The memory system (e.g., 4030) can include computer system readable media in the form of volatile memory, such as RAM and/or cache memory or others. The computer system (e.g., 4000) may further include other removable/non-removable, volatile/non-volatile computer system storage media.

The computer system (e.g., 4000) may communicate with one or more devices using the network adapter (e.g., 4050). The network adapter may support wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long term evolution (LTE), wireless LAN, Bluetooth, Zig Bee, or the like.

Illustrative embodiments of the present disclosure may include a system, a method, and/or a computer program product. The computer program product may include a non-transitory computer readable storage medium (e.g., the memory system 4030) having computer readable program instructions thereon for causing a processor to carry out aspects of the present invention.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EEPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the computing system 4000 from the computer readable storage medium or to an external computer or external storage device via a network. The network may include copper transmission cables, optical transmission fibers, wireless transmission, routers, firewalls, switches, gateway computers and/or edge servers. A network adapter card (e.g., 4050) or network interface in each computing/processing device receives computer readable program instructions from the network and forwards the computer readable program instructions for storage in a computer readable storage medium within the computing system.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computing system (e.g., 4000) through any type of network, including a LAN or a WAN, or the connection may be made to an external computer (for example, through the Internet using an Internet Service Provider). In an illustrative embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, system (or device), and computer program products (or computer readable medium). It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/tasks/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/tasks/actions specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, tasks or actions or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated but fall within the scope of the appended claims.

What is claimed is:

1. A cloud system for an application to be built and executed, comprising:
   a microservice platform including one or more application programing interfaces (APIs) configured for the application to access services of one or more services modules of the cloud system; and
   the one or more service modules in communication with the microservice platform and the application using the APIs, each of the service modules is configured to provide at least one service to the application, when being called using at least one API pertaining to each of the service modules,
   wherein the microservice platform is configured to allow an application control access to each of the service modules using a user account of the user,
   wherein the one or more service modules include at least one of a machine learning module, a sentiment analysis service module for determining a sentiment based on a user query, an intention analysis service module for determining an intention based on a user query, a card recommendation service module, a conversational intelligence service module, an on-demand analytics service module for providing an analytic result on user data stored in database to a user device, and
   wherein the intention analysis service module for determining an intention based on a user query, comprises:
   at least one processor;
   memory coupled to the at least one processor, the memory storing
   processor readable program instructions that, when executed by the at least one processor, cause the at least one processor to:
     receive a call from a the microservice platform through an application programing interface (API) along with the user query;
     split one or more keywords of the user query and store the split keywords into the memory;
     determine one or more candidate intentions based on the stored split keywords;
     determine respective confidence scores of the candidate intentions; and
     determine at least one of the candidate intentions as a matching intention of the user query, based on the determined confidence scores.

2. The cloud system of claim 1, wherein the microservice platform comprises at least one processor configured to provide at least one feature of:
   allowing an application developer to register for the cloud system as a new user;
   allowing the application developer to update his/her profile;
   calling at least one of the service modules in response to the at least one of the service modules being called by the application; and
   providing an output of the call of the at least one of the service modules to the application.

3. The cloud system of claim 2, wherein to allow the application developer to register for the cloud system as a new user, the at least one processor is further configured to:
   receive information entered by the developer including a contact, a password and a name;
   validate the information entered by the developer;
   validate the developer by sending a one-time passcode to the contact as chosen by the developer;
   generate a user ID and secret for the registered developer; and
   generate a user profile including the name and the password for the developer for future authentication.

4. The cloud system of claim 2, wherein to call at least one of the service modules, the at least one processor is further configured to:
   create an API endpoint exposed to the application that allows the application to call the at least one of the service modules pertaining to the API endpoint;
   define fields of input parameters for the at least one API endpoint, the input parameters including at least one of client ID, secret, query text, query mode, device type and query language; and
   calling the at least one of the service modules by passing values of the input parameters to the API pertaining to the at least one of the service modules through the API endpoint.

5. The cloud system of claim 4, wherein the APIs are Representational State Transfer (REST)ful APIs, and the output of the call of the at least one of the microservices is provided with a JavaScript Object Notation (JSON) format.

6. The cloud system of claim 4, wherein the at least one of the service modules is configured to:
   receive the API call from the microservice platform along with the input parameters;
   perform services defined in the at least one of the service modules based on the input parameters in response to the API call being validated; and
   output a response as a result of performing the services based on the input parameters, the response being outputted in a JSON format,
   wherein the at least one processor of the microservice platform is further configured to provide the output response to the application or at least one other service modules among the service models.

7. The cloud system of claim 1, wherein the microservice platform comprises at least one processor configured to:
   provide a dashboard portal for allowing an application developer to access one or more prebuilt contents of at least one of the service modules for each of a plurality of domains when the developer logins to the dashboard portal based on a user name and a password, the one or more prebuilt contents being available for each of a plurality of domains.

8. The cloud system of claim 7, wherein the microservice platform comprises at least one processor configured to:

allow the developer to switch between the domains to view a specific content for each domain.

9. The cloud system of claim 7, wherein the microservice platform comprises at least one processor configured to:
allow the developer to define a new content to the at least one of the service modules.

10. The cloud system of claim 7, wherein the microservice platform comprises at least one processor configured to:
allow the developer to download the contents from the at least one of the service modules.

11. The cloud system of claim 7, wherein the application is used for financial institutions to provide various banking services or financial information to a client.

12. The cloud system of claim 11, wherein the domains comprise a retail banking, a wealth management, an asset management, and a capital market.

13. The cloud system of claim 1, wherein the machine learning module, comprises:
at least one processor;
memory coupled to the at least one processor, the memory storing processor readable program instructions including at least one machine learning model that, when executed by the at least one processor, cause the at least one processor to:
associate the at least one machine learning model with an intention defined in an intention analysis module, wherein the intention analysis module in communication with the microservice platform and the machine learning module using at least one application programming interface (API), is configured to receive a call from the microservice platform along with a user query provided from an application and determine another intention matched to the user query;
receive a call from the microservice platform through the at least one API;
invoke the at least one machine learning model in response to determining that the another intention matched to the user query is the intention associated with the at least one machine learning model; and
generate, using the invoked at least one machine learning model, an output response based on one or more input parameters provided using the at least one API.

14. The cloud system of claim 1, wherein the sentiment analysis service module for determining a sentiment based on a user query, comprises:
at least one processor;
memory coupled to the at least one processor, the memory storing
processor readable program instructions that, when executed by the at least one processor, cause the at least one processor to:
receive a call from the microservice platform through an application programing interface (API) along with the user query;
split one or more keywords of the user query and store the split keywords into the memory;
determine one or more candidate sentiments based on the stored split keywords;
determine respective confidence scores of the candidate sentiments; and
determine at least one of the candidate sentiments as a matching sentiment of the user query, based on the determined confidence scores.

15. The cloud system of claim 1, wherein the card recommendation service module, comprises:
at least one processor;
memory coupled to the at least one processor, the memory storing
processor readable program instructions that, when executed by the at least one processor, cause the at least one processor to:
receive a call from the microservice platform through one or more application programing interfaces (APIs) along with a query of a user;
update one or more user preference flags according to a user preference input by the user, the user preference flags indicating a goal that the user wants to achieve from using cards;
determine a scenario of a plurality of scenarios stored in the memory, based on the user preference flags;
read corresponding reward information for each of a plurality of candidate cards from the memory;
calculate, for each of the plurality of candidate cards, a card recommendation score at least using the reward information, according to the determined scenario;
determine a card among the plurality candidate cards as the best card for recommendation based on the at least one of the weighted average value and the reward value; and
provide information of the recommended best card to a user interface device using the one or more APIs.

16. The cloud system of claim 1, wherein the conversational intelligence service module, comprises:
at least one processor;
memory coupled to the at least one processor, the memory storing
processor readable program instructions that, when executed by the at least one processor, cause the at least one processor to:
receive a call from the microservice platform through one or more application programing interfaces (APIs) along with a query of a user;
send the user query to an intention analysis service module, wherein the intention analysis module is in communication with the microservice platform and the conversational intelligence service module using the APIs and is configured to determine an intention based on the user query and one or more entities associated with the determined intention;
gather one or more output parameters including at least one of the determined intention of the user and the one or more entities;
send the gathered output parameters to one or more machine learning models of a machine learning module associated with the output parameters, the one or more machine learning models being configured to perform analytics based on the sent output parameters and generate an output response; and
send the generated output response to a user interface device for being displayed.

17. The cloud system of claim 1, wherein the on-demand analytics service module for providing an analytic result on user data stored in database to a user device, comprises:
at least one processor;
memory coupled to the at least one processor, the memory storing
processor readable program instructions including at least one analytical model that, when executed by the at least one processor, cause the at least one processor to:
define one or more machine learning (ML) models of an ML service module for the at least one analytical model;

call the ML module to execute the one or more ML models in response to determining that the at least one analytical model runs in an application, a portion of which is installed in the user interface device, wherein the on-demand analytics service module and the ML service module are in communication with the microservice platform via one or more application programing interfaces (API);

generate a dynamic query by executing the one or more ML models;

generate an output response of the on-demand service module by applying the generated dynamic query on the user data; and display the output response on a user interface of the user device.

18. A method for providing a cloud system for an application to be built and executed, comprising:

providing a microservice platform including one or more application programing interfaces (APIs), each of the APIs is configured for the application to access services of one or more services modules of the cloud system; and providing the one or more service modules in communication with the microservice platform and the application using the APIs, each of the service modules being configured to provide at least one service to the application, when being called using at least one API pertaining to each of the service modules, wherein the one or more service modules include at least one of a machine learning module, a sentiment analysis service module for determining a sentiment based on a user query, an intention analysis service module for determining an intention based on a user query, a card recommendation service module, a conversational intelligence service module, an on-demand analytics service module for providing an analytic result on user data stored in database to a user device, and wherein the intention analysis service module for determining an intention based on a user query, comprises:

at least one processor;

memory coupled to the at least one processor, the memory storing processor readable program instructions that, when executed by the at least one processor, cause the at least one processor to:

receive a call from a the microservice platform through an application programing interface (API) along with the user query;

split one or more keywords of the user query and store the split keywords into the memory;

determine one or more candidate intentions based on the stored split keywords;

determine respective confidence scores of the candidate intentions; and determine at least one of the candidate intentions as a matching intention of the user query, based on the determined confidence scores.

* * * * *